US011257120B2

(12) United States Patent
Maliszewski et al.

(10) Patent No.: US 11,257,120 B2
(45) Date of Patent: *Feb. 22, 2022

(54) SYSTEM AND METHOD FOR COORDINATED MOBILE MEDIA PROJECTION

(71) Applicant: Productive Application Solutions, Inc., Sheridan, WY (US)

(72) Inventors: Gerald Maliszewski, San Diego, CA (US); Peter Ta, Tucson, AZ (US)

(73) Assignee: Productive Application Solutions, Inc., Sheridan, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/179,574

(22) Filed: Feb. 19, 2021

(65) Prior Publication Data

US 2021/0201354 A1 Jul. 1, 2021

Related U.S. Application Data

(63) Continuation-in-part of application No. 17/168,313, filed on Feb. 5, 2021, which is a continuation-in-part
(Continued)

(51) Int. Cl.
*G06Q 30/00* (2012.01)
*G06Q 30/02* (2012.01)

(52) U.S. Cl.
CPC ..... *G06Q 30/0266* (2013.01); *G06Q 30/0244* (2013.01); *G06Q 30/0252* (2013.01); *G06Q 30/0267* (2013.01)

(58) Field of Classification Search
CPC .......... G06Q 30/0244; G06Q 30/0252; G06Q 30/0267
(Continued)

(56) References Cited

U.S. PATENT DOCUMENTS 4,259,660 A * 3/1981 Oliver .................. B60Q 1/2611
116/40
5,878,516 A * 3/1999 Amirian .................. G09F 21/04
40/591
(Continued)

FOREIGN PATENT DOCUMENTS

FR 2578996 A1 * 9/1986 ............. G09F 21/04
GB 2402254 A * 12/2004 ........... G06Q 20/127
(Continued)

OTHER PUBLICATIONS

Jingbin Liu et al. iParking: An Intelligent Indoor Location-Based Smartphone Parking Service. (Oct. 31, 2012). Retrieved online Aug. 26, 2020. https://www.ncbi.nlm.nih.gov/pmc/articles/PMC3522932/ (Year: 2012).*

(Continued)

*Primary Examiner* — James A Reagan
(74) *Attorney, Agent, or Firm* — Law Office of Gerald Maliszewski; Gerald Maliszewski

(57) ABSTRACT

A coordinated mobile media projection system is provided using multiple media projection systems (MPSs). Each MPS is attachable to a mobile platform (e.g., automotive vehicle or aircraft). Each MPS is selectively enabled to supply a portion of coordinated media, and includes a location subsystem to determine the geographic location of the MPS. The combination of the MPSs supplies a coordinated media integration or unified message, with a first portion of the coordinated media being linked to a second portion of the coordinated media. Each MPS may include a deployment subsystem to supply an enablement signal in response to either the mobile platform occupying an assigned position or the MPS being enabled. The geographic location determined by the locations subsystem may be a stationary location or a moving location route. The first and second portions of the
(Continued)

coordinated media may be identical, sequentially projected, form a billboard, or display related topics.

26 Claims, 14 Drawing Sheets

Related U.S. Application Data of application No. 17/133,722, filed on Dec. 24, 2020, now Pat. No. 11,055,743, which is a continuation-in-part of application No. 17/097,256, filed on Nov. 13, 2020, which is a continuation-in-part of application No. 17/071,043, filed on Oct. 15, 2020, now Pat. No. 11,037,199, which is a continuation-in-part of application No. 17/023,546, filed on Sep. 17, 2020, now Pat. No. 10,991,007, which is a continuation of application No. 17/007,575, filed on Aug. 31, 2020, which is a continuation of application No. 16/869,696, filed on May 8, 2020, now Pat. No. 10,803,488, which is a continuation of application No. 16/601,362, filed on Oct. 14, 2019, now Pat. No. 10,796,340.

(60) Provisional application No. 62/779,972, filed on Dec. 14, 2018.

(58) Field of Classification Search
USPC .......... 705/14.63, 14.62, 14.49, 14.4; 725/32
See application file for complete search history.

(56) References Cited

U.S. PATENT DOCUMENTS

| | | | | |
|---|---|---|---|---|
| 5,974,711 | A * | 11/1999 | Tipke | G09F 21/04 362/503 |
| 6,247,257 | B1 * | 6/2001 | Powell | G09F 21/04 280/507 |
| 6,412,202 | B1 * | 7/2002 | Oswood | G09F 21/04 40/204 |
| 6,918,200 | B2 * | 7/2005 | Pena | G09F 21/02 40/591 |
| 6,971,070 | B2 * | 11/2005 | Obradovich | B60W 50/14 715/835 |
| 7,347,017 | B2 * | 3/2008 | Shaffer, Jr. | G09F 21/04 296/21 |
| 7,774,966 | B2 * | 8/2010 | Rosa | G09F 21/048 40/590 |
| 7,882,653 | B2 * | 2/2011 | Barlow | G06Q 30/0275 40/606.15 |
| 8,418,386 | B1 * | 4/2013 | Key | G09F 21/048 40/590 |
| 9,076,336 | B2 * | 7/2015 | Tippelhofer | G08G 1/148 |
| 9,939,287 | B2 * | 4/2018 | Castellucci | G01C 21/3476 |
| 10,382,579 | B2 * | 8/2019 | Mevissen | H04L 67/306 |
| 10,482,766 | B2 * | 11/2019 | Mowatt | G08G 1/144 |
| 10,733,891 | B2 * | 8/2020 | Chow | G08G 1/04 |
| 2002/0009978 | A1 * | 1/2002 | Dukach | G08G 1/01 455/99 |
| 2006/0265922 | A1 * | 11/2006 | Shaffer, Jr. | G09F 21/048 40/591 |
| 2009/0084009 | A1 * | 4/2009 | Vandergriff | G09F 13/18 40/546 |
| 2011/0131235 | A1 * | 6/2011 | Petrou | G06F 16/532 707/769 |
| 2012/0245966 | A1 * | 9/2012 | Volz | G06Q 10/02 705/5 |
| 2013/0307706 | A1 * | 11/2013 | Kriezman | B60Q 1/503 340/988 |
| 2014/0214319 | A1 * | 7/2014 | Vucetic | G01C 21/3446 701/533 |
| 2014/0309865 | A1 * | 10/2014 | Ricci | G06F 16/583 701/36 |
| 2015/0123818 | A1 * | 5/2015 | Sellschopp | G08G 1/096816 340/932.2 |
| 2015/0254721 | A1 * | 9/2015 | Rad | G06Q 30/0266 705/14.63 |
| 2015/0279210 | A1 * | 10/2015 | Zafiroglu | G08G 1/065 340/932.2 |
| 2016/0116293 | A1 * | 4/2016 | Grover | G01C 21/34 701/23 |
| 2016/0191879 | A1 * | 6/2016 | Howard | H04N 9/3147 348/745 |
| 2017/0309170 | A1 * | 10/2017 | Wang | G08G 1/146 |
| 2018/0186309 | A1 * | 7/2018 | Batten | B60Q 1/56 |
| 2018/0186311 | A1 * | 7/2018 | Mason | B60R 21/01 |
| 2019/0121522 | A1 * | 4/2019 | Davis | G06F 3/04815 |
| 2019/0135180 | A1 * | 5/2019 | Watatsu | B60R 1/001 |
| 2021/0001724 | A1 * | 1/2021 | Dobashi | B60K 35/00 |

FOREIGN PATENT DOCUMENTS

| | | | | |
|---|---|---|---|---|
| JP | 2010026474 | A * | 2/2010 | G09F 21/048 |
| JP | 2018072077 | A * | 5/2018 | G01S 19/14 |
| JP | 2018205399 | A * | 12/2018 | G09F 21/04 |
| WO | WO-2008135617 | A1 * | 11/2008 | G08G 1/0175 |

OTHER PUBLICATIONS

Ted Morris et al. A Comprehensive System for Assessing Truck Parking Availability Final Report. (Jan. 2017). Retrieved online Aug. 26, 2020. https://www.dot.state.mn.us/ofrw/PDF/assessing-truck-parking.pdf (Year: 2017).*
Mateusz Jozef Kulesza. E-Park: Automated-Ticketing Parking Meter System. (Apr. 2, 2015). https://dash.harvard.edu/bitstream/handle/1/17417570/KULESZA-SENIORTHESIS-2015.pdf?sequence=1&isAllowed=y (Year: 2015).*
Florian Alt. A Design Space for Pervasive Advertising on Public Displays. (Jul. 12, 2012). Retrieved online Aug. 13, 2020. https://pdfs.semanticscholar.org/4bef/aba88eb1d14e81dcd610658bccbbf287b770.pdf (Year: 2012).*
Ben Coxworth. Truck-mounted billboards morph with the miles. (Sep. 12, 2016). Retrieved online Aug. 13, 2020. https://newatlas.com/roadads-eink-truck-billboards/45380/ (Year: 2016).*
Technoframe. LED Bus Screens. (Nov. 18, 2011). Retrieved online Aug. 13, 2020. https://technoframe.com/led-bus-screens (Year: 2011).*
Livedesign. Art on the MART: World's Largest Permanent Projection Mapping System. (Nov. 29, 2018). Retrieved online Oct. 23, 2021. https://www.livedesignonline.com/excellence-installation-awards/art-themart-world-s-largest-permanent-projection-mapping-system (Year: 2018).*
Parker, Phillip, "The 2018-2023 World Outlook for Outdoor Advertising", 2017 ICON Group International.

* cited by examiner

SYSTEM AND METHOD FOR COORDINATED MOBILE MEDIA PROJECTION

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to mobile media presentation and advertising and, more particularly, to a system and method for combining the media displays of multiple mobile platforms into a unified mobile message.

2. Description of the Related Art

Automotive vehicles are one of the most costly expenses incurred by the average consumer. Ironically, most automobiles sit idle for a large portion of the day. U.S. Pat. No. 10,796,340, entitled SYSTEM AND METHOD FOR TARGETING THE DISTRIBUTION OF MEDIA FROM A MOBILE PLATFORM, invented by Peter Ta et al., and filed on Oct. 14, 2019, addresses the problem of finding more outdoor advertising space by describing an automotive targeted parking system that adds to an automobile, the additional feature of a media display subsystem, and which may also include a Wireless Local Area Network (WLAN) IEEE 802.11 (WiFi) access point (hotspot).

As an alternative, drone aircraft (unmanned aerial vehicles (UAVs)) are capable of a broader range of coverage than an automobile, and their flight paths can be controlled from remote locations. Drones have been used to present 2-dimensional, 3-dimensional, and persistent illusion images using light emitting diodes (LEDs) and liquid crystal displays (LCDs). U.S. Ser. No. 17/023,546, entitled ARIAL BILLBOARD, invented by Peter Ta et al, filed on Sep. 17, 2020, describes the use of aircraft to project media. In one aspect, the separate media messages from a plurality of aircraft are combined to form an integrated billboard.

It would be advantageous if the media projection subsystems of ground-based vehicles could be combined to form an integrated billboard.

It would be advantageous if the media projection subsystems of ground-based vehicles could be combined with the media projection subsystems of aircraft to form an integrated billboard.

It would be advantageous if the mobile platforms participating in the above-mentioned integrated billboard could be tracked, recorded, and continuously verified.

SUMMARY OF THE INVENTION

A system and method are disclosed herein for groups of media projection systems, attached to mobile platforms that may include ground-based vehicles and aircraft, to combine their individual media projections to create a unified media message, where the whole is greater than the sum of its parts. Thus, the system may act as a mobile advertising platform that seeks to expand and capture market share within the outdoor advertising market segment by directing the selective deployment of media to preferred target locations. The mobile platforms in the system may transmit the following information: (i) a unique identifier for the device in use (for example, radio-frequency identification), (ii) the time, date, duration, and location (using global positioning satellite (GPS) or cellular triangulation systems), (iii) an indication that the media projection has been deployed. Graphic Information System (GIS) mapping technology may be used to compensate a person or business entity associated with the mobile platforms for operating in specified locations.

Accordingly, a coordinated mobile media projection system is provided including a plurality of media projection systems (MPSs). Each media projection system is configured for attachment to a mobile platform. As noted above, each MPS can be either a ground-based platform (e.g., automotive vehicle) or an aircraft (e.g., a drone), and the system may employ both kinds of mobile platforms. Each MPS is selectively enabled to supply a portion of coordinated media, and a location subsystem determines the geographic location of the MPS. The media may be visual or audio, or both. The combination of the MPSs supplies a coordinated mobile media integrated display or unified message, with a first portion of the coordinated media being linked to a second portion of the coordinated media.

In one aspect, each MPS includes a deployment subsystem having an interface to supply an enablement signal in response to either the mobile platform occupying an assigned position or the MPS being enabled. In another aspect, each MPS is associated with an identification code and includes a communications subsystem having an interface to receive verification information including the identification code, the enablement signal, and the geographic location. The communications subsystem has an interface store the verification information in local memory or to transmit the verification information to a central controller, typically enabled with a server or network of servers. The geographic location that is determined by the locations subsystem may be a stationary location and a moving location (i.e., a path or route).

For example, the first and second portions of the coordinated media may be identical. Otherwise, the coordinated media integrated display may be made up of a second portion of the coordinated media being presented subsequent to the first portion of the coordinated media. In another aspect, the first portion of the coordinated media is a first half of a billboard display and the second portion of the coordinated media is a second half of the billboard display. In one variation, the first portion of the coordinated media is a first topic and the second portion of the coordinated media is a second topic, related to the first topic.

The system may also include a targeting software application that permits the selection the MPS geographic locations from a plurality of potential geographic locations. Each potential geographic location may have a corresponding weighted value, and entities (e.g., person or business) associated with the MPSs may receive rewards corresponding to the value of the selected geographic location. The MPSs in the system may also incorporate a camera so that images can be downloaded, and a publically accessible access point (IEEE 802.11 Wireless Local Area Network (WLAN) or IEEE 802.15 Wireless Personal Area Network (WPAN).

In one aspect, the MPSs in the system may operate in a master-slave arrangement, where a first MPS stores both the first portion of the coordinated media and the second portion of the coordinated media in local memory. The first MPS communications subsystem transmits the second portion of the coordinated media to a second MPS. The first MPS presents the first portion of the coordinated media. The second MPS communications subsystem receives the second portion of the coordinated media from the first MPS, and presents the second portion of the coordinated media. In one aspect, the MPSs receive media uploads from a server. If arranged in a master-slave relationship, only one MPS may receive the uploads, which it then distributes to other MPSs in the system.

Also provided is a method for coordinating mobile media partitioned projections. The method provides a plurality of MPSs as described above, with each MPS configured for attachment to a mobile platform. The method determines the geographic location of each MPS, which may be a stationary location of a moving route. Each MPS selectively presents a portion of a coordinated media to create a coordinated mobile media integrated display, with a first portion of the coordinated media being linked to a second portion of the coordinated media. Each MPS may supply an enablement signal, in response to the mobile platform occupying an assigned position, the MPS media being presented, or a combination thereof. Further, each MPS may have an identification code, and the method transmits verification information including the identification code, the enablement signal, and the geographic location, to a server.

Additional details of the above-described system and associated method of implementation are provided below.

DETAILED DESCRIPTION

FIGS. 1A through 1E are diagrams depicting a coordinated mobile media projection system. The system 100 comprises a plurality of media projection systems (MPSs). MPS 102-1 and 102-2 are shown, but it should be understood that the system is not limited to any particular number of MPSs. Each media projection system is configured for attachment to a mobile platform. The mobile platforms may be a ground-based platform, water-based platform, or an aircraft, and the system 100 may include all these kinds of platforms. Examples of a water-based platform include a boat, raft, buoy, waverunner (jet ski). Examples of aircraft include a micro air (aerial) vehicle (MAV) or miniature unmanned aerial vehicle (UAV), more colloquially known as a drone, or even an manned aircraft, drone taxi, or helicopter. The system 100 is not limited to any particular type of aircraft. Some common examples of a ground-based vehicle include an automotive vehicle, including a shared automated vehicle (SAV), similar to ones provided by First Transit. Other ground-based mobile platform examples include a scooter, truck, a towed trailer, or portable objects that a small enough to be moved without wheels, (e.g., a sidewalk sandwich board). Shown is mobile platform 104-1 associated with MPS 102-1, and mobile platform 104-2 associated with MPS 102-1. In the case of a system using a combination of ground-based platforms and drone aircraft, the ground-based platforms may include drone charging stations so that power to the drone can be periodically refreshed. The mobile platforms may also include an internal battery and/or cables for attachment to an external power source. The chassis typically includes miscellaneous electronic circuitry required to support the major components described below, as would well understood in the art.

Figure 1A:
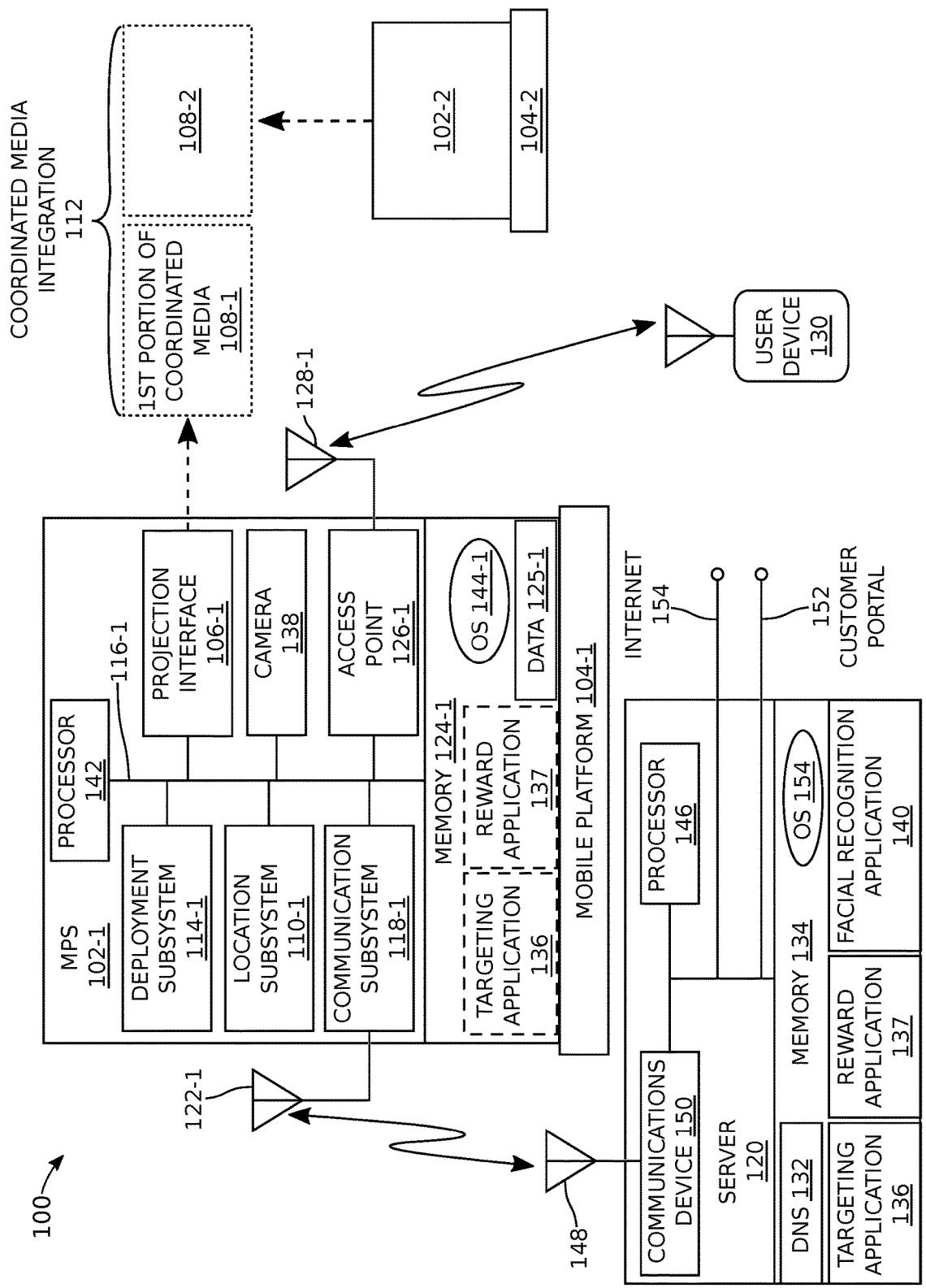
FIGS. 1A through 1E are diagrams depicting a coordinated mobile media projection system.
Figure 1B:
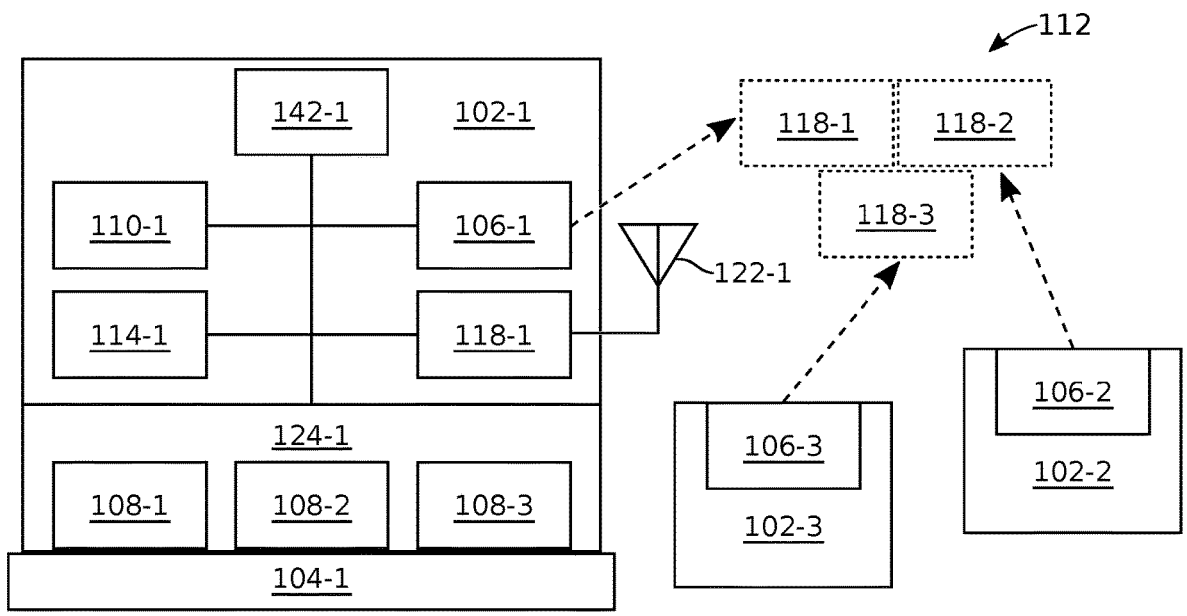
Figure 1C:
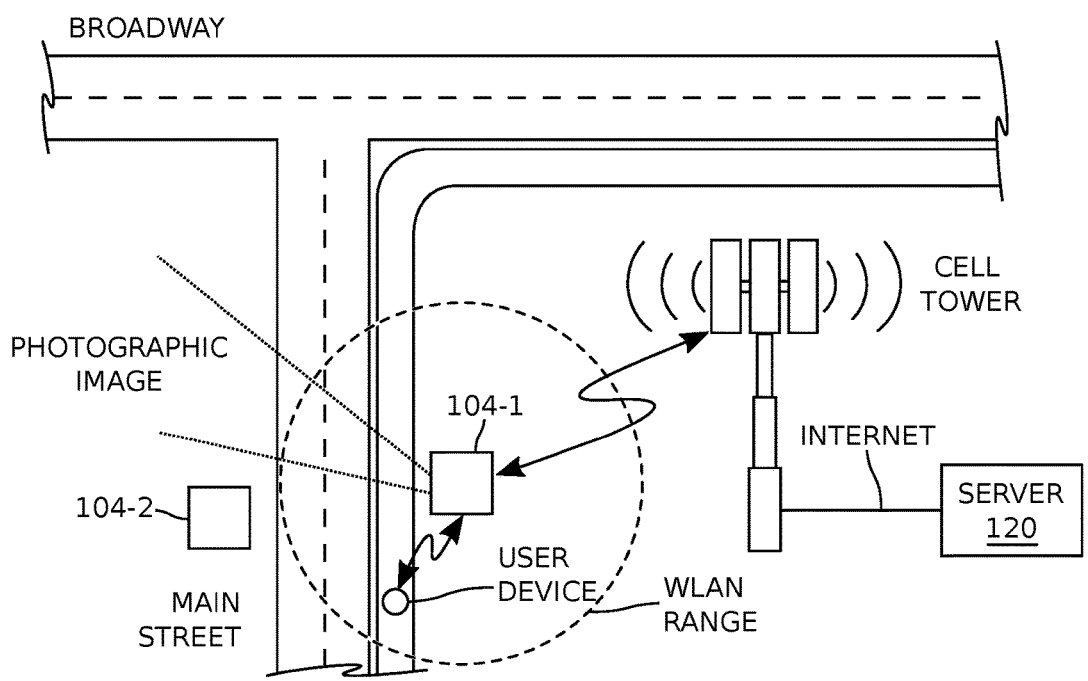
Figure 1D:
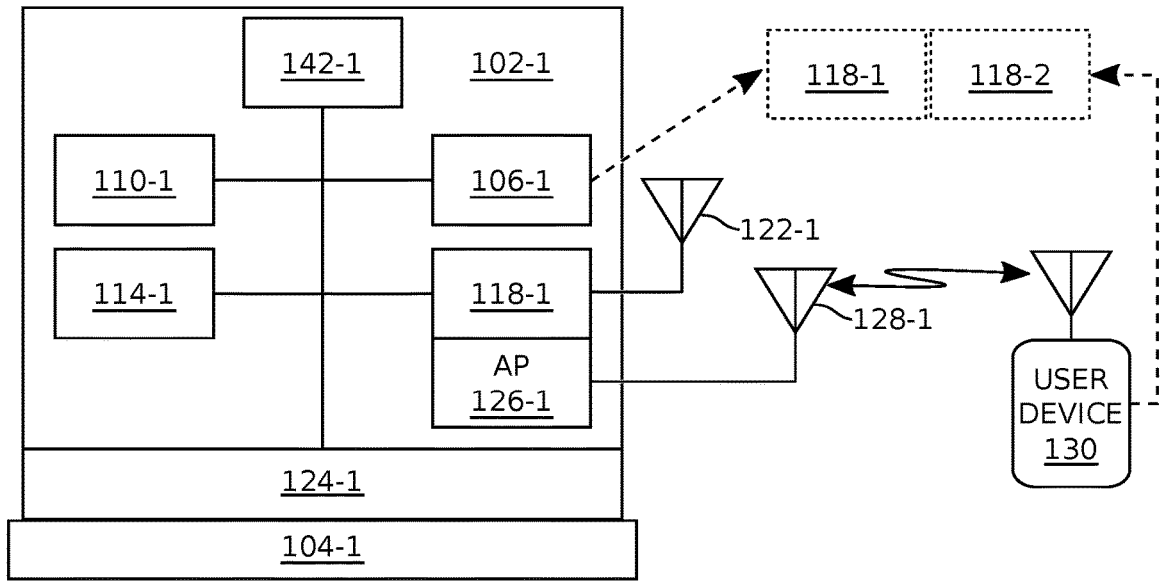
Figure 1E:
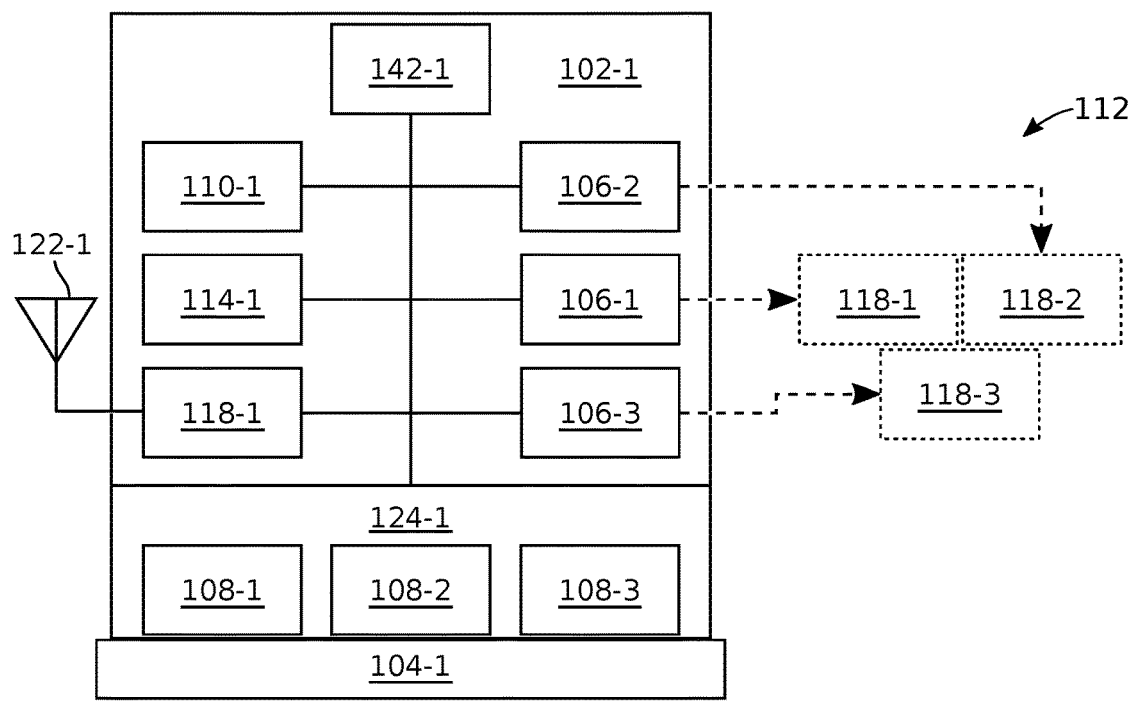

Using MPS 102-1 as an example, each MPS comprises a selectively enabled interface 106-1 supplying a portion of coordinated media 108-1 (as represented in phantom). The MPS interface 106-1 supplies a displayed image, a broadcast sound, or a combination thereof. Some examples of the interface 106-1 include a screen over an exterior surface of the platform, including a lighted screen, an electroluminescent screen, an e-ink (electronic paper) screen, a projector-lite screen, a screen depicting a fixed non-transitory image, a screen depicting a transitory (moving) image, a transitory or non-transitory screen using light emitting diodes (LEDs), a retractable screen deployed over an exterior surface of the mobile platform, or an LCD or LED TV monitor type display, a media topper, a popup, a wallscape, or a switchable glass display or light controlled glass (such as made by Gauzy), and combinations thereof. The screen may cover an interior or exterior window surface, cover an exterior surface of a vehicle, or the screen may extend vertically up from an automobile roof as a popup. However, it should be understood that the viewing screen may, alternatively, be deployed over other exterior surfaces (e.g., front or back). Although not shown, the system 100 may include screens overlying both driver and passenger side doors. Interface 106-1 can also be a projector image appearing on a window or exterior surface of the platform, on a screen, or on a surface adjacent to the platform. A projector image relayed through a vehicle rear view or side mirror, and may be combined with any of the above-mentioned screens, with or without a field of LEDs. The interface 106-1 may also be a holographic display. In another aspect, the MPS interface is the display and/or speaker of a personal device (e.g., smartphone) wirelessly connected to an MPS access point, as shown in FIG. 1D. In other words, the interface 106-1 may be a 2-dimensional or 3-dimensional image, which may or may not be transitory. Transitory images include a series of still images, videos, or combinations thereof. In the one aspect, at least some portions of the media being projected may rotate around a vertical z axis.

A location subsystem 110-1 determines the geographic location of MPS 102-1. Examples of a location subsystem 110-1 include a Global Positioning Satellite (GPS) system receiver, assisted GPS taking advantage of cell tower data, a Wireless Local Area Network IEEE 802.11 (WiFi) positioning system, cell-site multilateration, satellite multilateration, inertial system, or a hybrid positioning system. Hybrid positioning systems find locations using several different positioning technologies, such as GPS, combined with cell tower signals, wireless internet signals, Bluetooth sensors, IP addresses, and network environment data. Cell tower signals have the advantage of not being hindered by buildings or bad weather, but usually provide less precise positioning. WiFi positioning systems may give very exact positioning in urban areas with high WiFi density, depending on a comprehensive database of WiFi access points. Further, a LORAN type system or LoJack® type system might be adapted for the purpose of location determination. As noted in U.S. Pat. No. 10,796,340, which is incorporated herein by reference, camera images and the location data of proximate smartphones, laptops, and personal communication devices can also be used to determine location.

The combination of interfaces 106-1 and 106-2 supplies a coordinated mobile media integrated display 112, typically a unified image or billboard, with a first portion of the coordinated media 108-1 being linked to a second portion of the coordinated media 108-2, as explained in more detail below.

In one aspect, again using MPS 102-1 as an example, the system 100 further comprises a deployment subsystem 114-1 having an interface to supply an enablement signal on line 116-1, in response to mobile platform 104-1 occupying an assigned position, MPS 106-1 being enabled, or a combination thereof.

In one aspect, again using MPS 102-1 as an example, each MPS, a component of the MPS, or an attached mobile platform, is associated with an identification code. In some aspects, the identification code can be extrapolated from an address associated with the communications subsystem 118-1, the location subsystem 110-1, or the mobile platform 104-1. Otherwise, the identification code is a code loaded into local memory 124-1, or alternatively it can be a mechanical device, such as a DIP switch. Then, each MPS (e.g., MPS 102-1) further comprises a communications subsystem 118-1 having an interface to receive verification information on line 116-1 including the identification code, the enablement signal, and the geographic location. The communications subsystem 118-1 has an interface to transmit the verification information to a server 120 via antenna 122-1. Alternatively, the verification information can be saved in a non-transitory local memory 124-1 as data 125-1 for subsequent wireless or hardwired downloading.

The most typical examples of a communication subsystem are cellular systems (e.g., Global System for Mobile Communications (GSM), Universal Mobile Telecommunications System (UMTS)-time division duplexing (TDD), Long-Term Evolution (LTE), $4^{th}$ Generation (4G), or $5^{th}$ Generation (5G)), and the like. Less typically, the communications subsystem may be enabled with WLAN IEEE 802.11 (WiFi), or even Long Range Wireless transceiver. Some examples of a Long Range Wireless system include Digital Enhanced Cordless Telecommunications (DECT), Evolution-data Optimized (EVDO), General Packet Radio Service (GPRS), High Speed Packet Access (HSPA), IEEE 802.20 (iBurst), Multichannel Multipoint Distribution Service (MMDS), Muni WiFi, commercial satellite, and IEEE 802.16 Worldwide Interoperability for Microwave Access (WiMAX (WiBro)). As another alternative, the communication messages may be stored in the system local memory 124 and periodically downloaded using a wireless or hardwire connection. The system 100 is not limited to any particular type of communication subsystem.

The memories described herein may be any type or form of non-volatile storage device or medium capable of storing data and/or other computer-readable instructions. Examples of memories include, without limitation, Read Only Memory (ROM), flash memory, or any other suitable memory device. Although not required, in certain embodiments, the systems described herein may include both a volatile memory unit and a non-volatile storage device. The memory may be implemented as shared memory and/or distributed memory in a network device.

In some aspect, it is possible for the communication subsystem 118-1 to receive uploads, including the portions of the coordinated media, from a server. Each MPS may receive its own coordinated media portion. Alternatively, the coordinated media portions may be distributed by a master MPS (e.g., MPS 102-1). The MPSs are arranged in a master-slave arrangement as shown in FIG. 1B, where the first MPS memory 102-1 includes the first, second, and third portions of the coordinated media, respectively 108-1, 108-2, and 108-3. The communications subsystem 118-1 transmits the second portion of the coordinated media 108-2 to the second MPS 102-2, and the third portion of the coordinated media 108-3 to a third MPS-3, with the first MPS 102-1 retaining the first portion 108-1. The communication subsystems (not shown) of the second MPS 102-2 and third MPS 102-3, respectively receive the second and third portions of the coordinated media from the first MPS 102-1. Then, the second MPS 106-2 supplies the second portion of the coordinated media 108-2, and the third MPS 106-3 supplies the third portion 108-3. In one aspect, the portions of the coordinated media need not necessarily be stored in non-transitory memory, but rather in volatile memory, especially if the media is uploaded on-the-fly, or if it is frequently changed. Alternatively, the first, second, and third portions of the coordinated media need not be wirelessly uploaded, but may be loaded into non-transitory memory 124-1 using any conventional means.

Figure 2A:
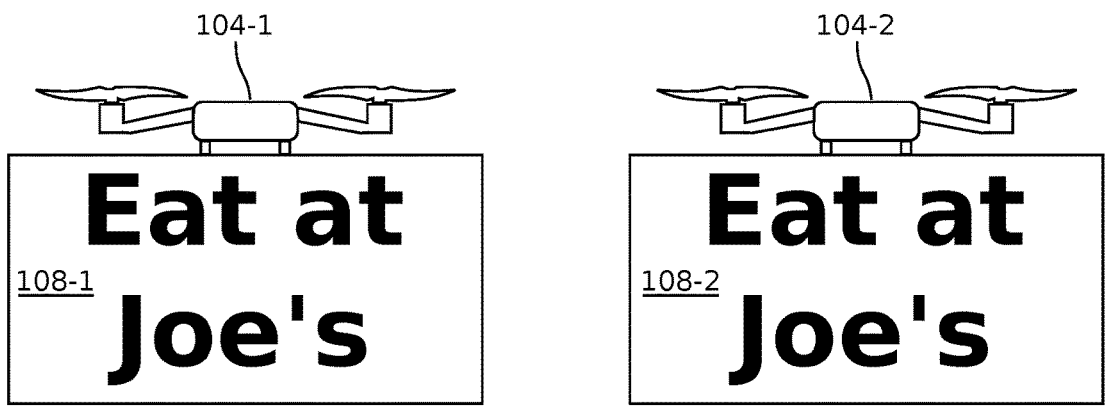
FIGS. 2A through 2H depict examples of coordinated mobile media integrated displays.
Figure 2B:
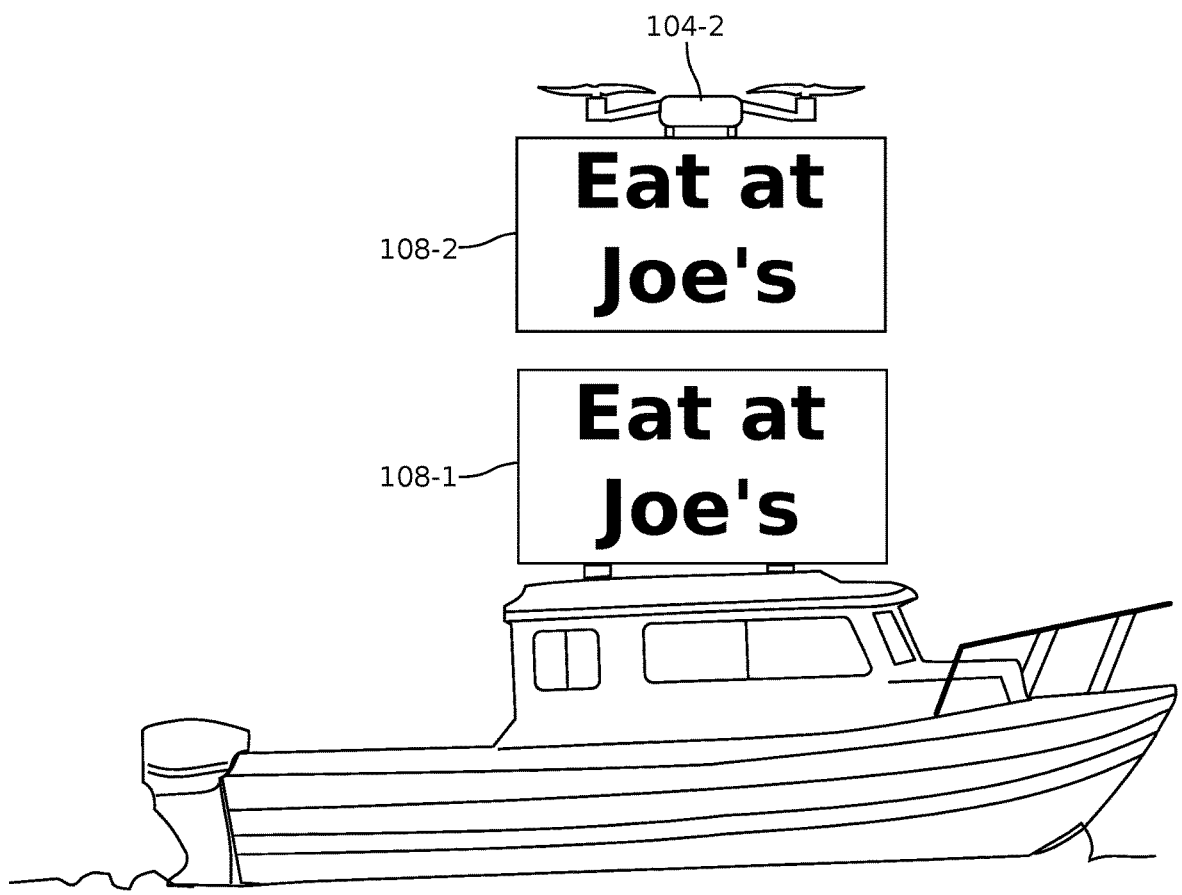

FIGS. 2A through 2H depict examples of coordinated mobile media integrated displays. In FIG. 2A a first portion of the coordinated media 108-1 is identical to the second portion of the coordinated media 108-2, where the mobile platforms are drone vehicles, 104-1 and 104-2. In FIG. 2B a first portion of the coordinated media 108-1 is again identical to the second portion of the coordinated media 108-2, but mobile platform 104-1 is a boat and mobile platform 104-2 is a drone. Although not explicitly depicted, the coordinated media can be presented by any combination of water craft, land-based mobile platform, or aircraft.

Figure 2C:
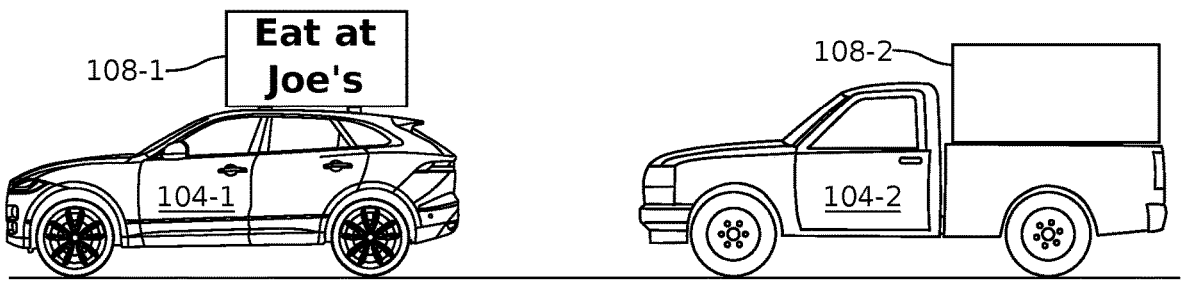
Figure 2D:
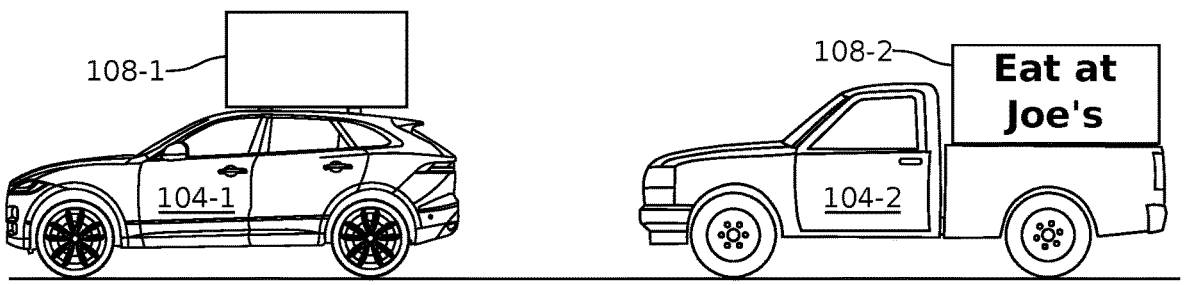

In FIG. 2C the first portion of the coordinated media message 108-1 is projected at a first time. In FIG. 2D the second portion of the coordinated media message 108-2 is presented subsequent to the first portion of the coordinated media 108-1. The mobile platforms depicted are automotive vehicles 104-1 and 104-2. Alternatively but not shown, one mobile platform can be an automotive vehicle and the other platform a drone aircraft or water-based platform, or both platforms can be drones or water craft, or combinations thereof. In one aspect, the sequential projections need not be identical.

Figure 2E:
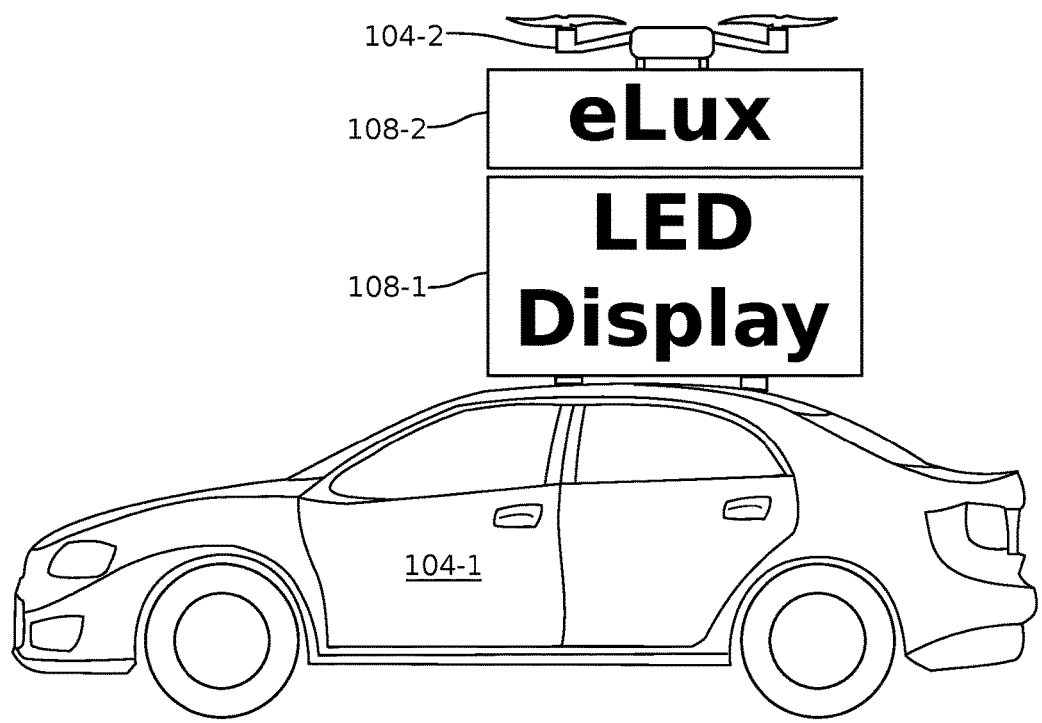

In FIG. 2E the first portion of the coordinated media 108-1 is a first half of a billboard display and the second portion of the coordinated media 108-2 is a second half of the billboard display. The mobile platforms depicted are an automotive vehicle 104-1 and a drone aircraft 104-2. Alternatively but not shown, both mobile platforms can be automotive vehicles, drones, water craft, or combinations thereof.

Figure 2F:
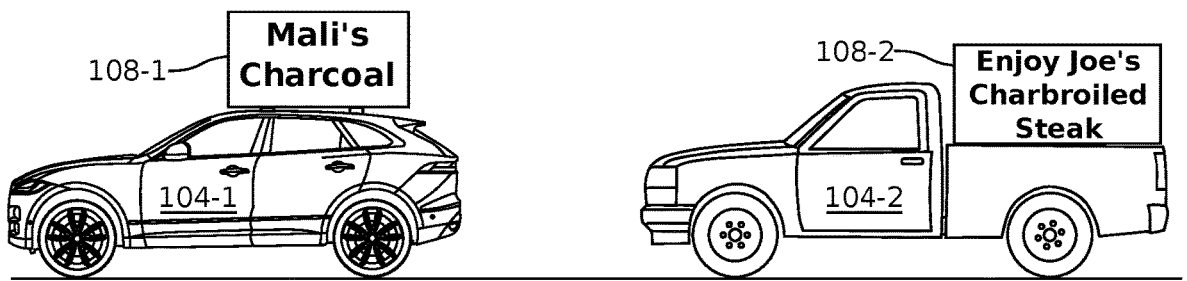

In FIG. 2F the first portion of the coordinated media 108-1 is a first topic and the second portion of the coordinated media 108-2 is a second topic, related to the first topic. The mobile platforms depicted are automotive vehicles 104-1 and 104-2. Alternatively but not shown, one mobile platform can be an automotive vehicle and the other platform a drone aircraft or water craft, or both can be drones or water craft, or combinations thereof. U.S. Ser. No. 17/023,546, incorporated herein by reference, describes an aerial billboard formed by combining the displays of multiple aircraft.

Figure 2G:
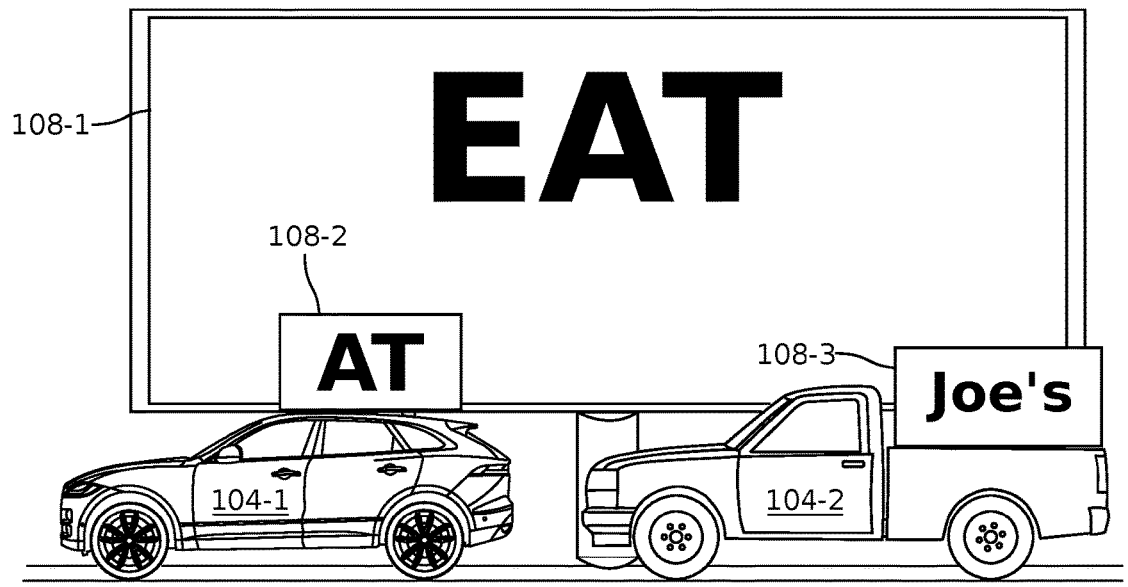

In FIG. 2G the first portion of the coordinated media 108-1 is projected by a permanently stationary (i.e., conventional) billboard, the second portion of the coordinated media 108-2 is attached to automotive vehicles 104-1, and a third portion of the coordinated media 108-2 is attached to automotive vehicle 104-2. In this example, the coordinated portions form a coordinated mobile media integrated display resembling a multi-part billboard display. Otherwise, the various coordinated media portions may be identical, as in FIG. 2A, sequentially presented as in FIG. 2C, or projected as related topics as in FIG. 2F.

Figure 2H:
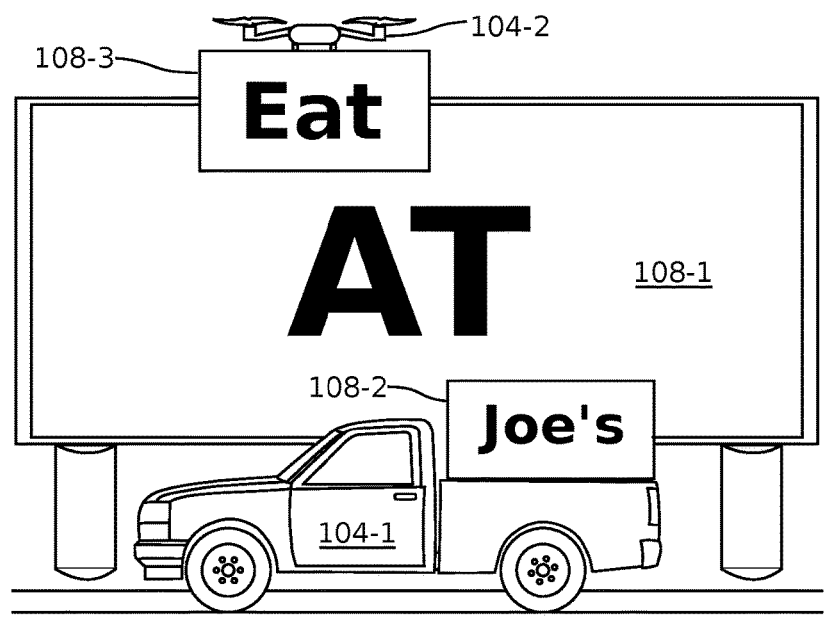

In FIG. 2H the first portion of the coordinated media 108-1 is projected by a permanently stationary (i.e., conventional) billboard, the second portion of the coordinated media 108-2 attached to automotive vehicles 104-1, and a third portion of the coordinated media 108-3 is attached to a drone aircraft 104-3. In this example, the portions form a coordinated media integration resembling a multi-part billboard display. Otherwise, the various coordinated media portions may be identical, as in FIG. 2A, sequentially presented as in FIG. 2C, or projected related topics as in FIG. 2F. Other combinations of integrated media may be formed by using combinations of the above-described projection examples.

Figure 13:
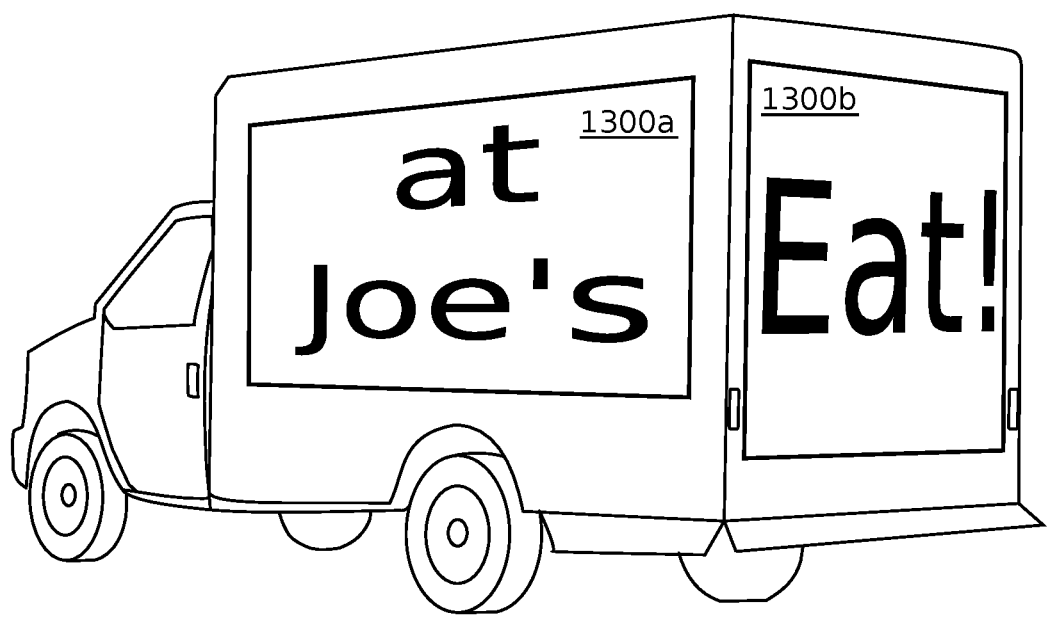
FIG. 13 is a diagram depicting MPS media interfaces formed on multiple surfaces of a truck body.

In one aspect as shown in FIG. 13, multiple MPSs may be mounted on the same mobile platform. As shown in more detail in FIG. 1E, interfaces 106-1, 106-2, and 106-3 may be mounted on the same mobile platform 104-1 to respectively present media 108-1, 108-2, and 108-2, to make up a coordinated media 112. As above, the MPSs may present identical coordinated media, coordinated media presented in a time sequence (typically spaced in time to make intuitive sense as a unified message), related topics, or as different sections of a billboard.

Figure 3A:
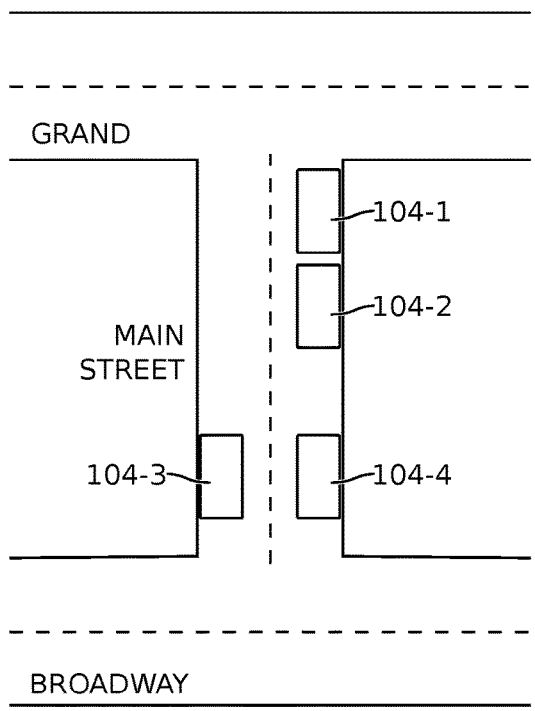
FIGS. 3A and 3B are plan views depicting coordinated media positioning.
Figure 3B:
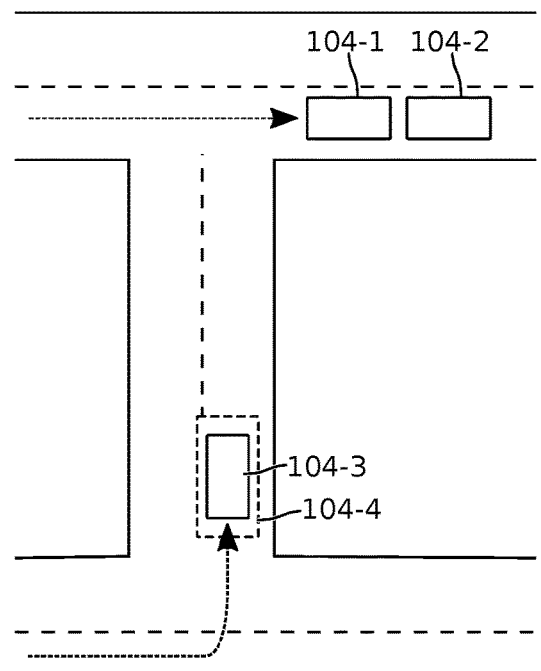

FIGS. 3A and 3B are plan views depicting coordinated media positioning. In FIG. 3A the geographic location of the mobile platforms is stationary. The term "stationary" as used herein is relative, as the ability of an aircraft to hover without moving is dependent upon the type of aircraft and weather conditions. In the case of fixed wing aircraft, hovering in a stationary position may entail flying in a pattern (e.g., circular or figure-8) around a fixed location. Likewise, the ability of a ground-based platform to park in an assigned position is not always assured, and parking locations are typically only temporarily stationary. In this example, mobile platforms 104-1 and 104-2 are located serially adjacent. Mobile platforms 104-3 and 104-4 are parked on opposite sides of the street. Alternatively, if at least one of the mobile platforms is an aircraft such as a drone, then the platforms can be vertically stacked and stationary.

In FIG. 3B the mobile platforms occupy a moving location or route. Mobile platforms 104-1 and 104-2 are ground vehicles driving in tandem down Grand street. Mobile platform 104-3 is a ground-based vehicle (shown in phantom) and mobile platform 104-4 is an aircraft flying above mobile platform 104-3, as they both proceed along a route down Main Street. With respect to both FIGS. 3A and 3B, the distance between coordinated media portions sufficient to create a coordinated media integration is relative, based upon an observer's subjective perception. Typically however, all the portions of the coordinated media are visible or audible from a stationary observer's frame of reference. Alternatively, if the mobile platforms or the observer are moving, the portions of coordinated media are observed within a short duration of time (e.g., less than a minute and more typically within a few seconds). The distance or duration may be constrained by traffic conditions, weather conditions, parking availability, and legal restrictions.

Returning to FIG. 1A, a targeting software application 136 may be stored in a non-transitory memory, enabling a sequence of processor executable instructions, permitting the selection the MPS geographic locations from a plurality of potential geographic locations. The targeting application may be stored in server memory 134. Alternatively, using MPS 102-1 as an example, the targeting application 136 may be stored in local memory 124-1, as shown in phantom. As explained in greater detail in U.S. Pat. No. 10,796,340, incorporated herein by reference, each potential geographic location may have a corresponding weighted value. The MPSs are associated with corresponding entities that may: own the MPSs, temporarily acquire the MPSs to project media, manage the MPSs for the owners or server clients entities requesting media projection services, or combinations thereof. Some or all of these entities may receive or provide rewards corresponding to the value of the selected geographic location. A reward application 137 may be embedded with the server 120 or stored in local memory 124-1, as shown in phantom. As used herein, an "entity" may be a person, a business, a corporation, or any type of social or business unit able to claim ownership of, or association with, the identification code, mobile platform, MPS, server, or server client. Entities may also be rewarded based upon the content of the media being projected.

The most obvious type of reward is money. However, the entities may alternatively be rewarded with bitcoin, cryptocurrency, coupons, or services. In one aspect, the target location is selected from a plurality of weighted (in value of importance) target locations, in response to the specific geographic location of where the media projection subsystem is located. For example, the target location may be weighted in response to geographic location factors such as proximate vehicular traffic, line of sight from a particular vantage point, proximate pedestrian traffic, proximity to cultural events, proximity to cultural facilities, and combinations thereof. A cultural event is generally understood to be an activity involving human beings. Likewise, a cultural facility is a facility used by human beings, such as a museum, office building, or grocery store parking lot. As a more explicit example, a target location may have a first value if the MPS is enabled within X feet of a particular location, and second value, greater than the first value, if the media projection subsystem is enabled within X/2 feet of the same location. Other factors reflected in the weighting of the target locations may include the type of media being projected, the time of day, the day of the week, the date, the length of time the media is being projected, and combinations thereof. There may be locations, such as parks, hospitals, or freeways where signage or parking is legally restricted, and in one aspect these locations are given a target value of zero. In one aspect, the system may even prevent the enablement of the media projection subsystem in legally restricted areas. The system 100 described herein is not limited to any particular factors weighting a target location. The system may be interactive in the sense that the first entity may select a deployment location after determining the value of a location. In this sense, the targeting application does not so much direct the media presentation subsystem to a particular predetermined location, as suggest multiple possible locations. Although the target locations and weights may be predetermined, in some aspects the weighting for non-predetermined areas may be calculated concurrently with the deployment of the media projection subsystem. That is, the target locations and the target location weights need not necessarily be predetermined.

In one aspect, at least one of the MPSs (e.g., MPS 102-1), may further comprise a publically accessible access point 126-1, such as a Wireless Local Area Network (WLAN) device (e.g. a WiFi hotspot). As an alternative or in addition, the access point may be a publically accessible Wireless Personal Area Network (WPAN) IEEE 802.15 device, examples of which include Li-Fi, wireless USB, and Bluetooth. Even more unlikely as an access point are Long Range Wireless systems. In the case of the access point being a WiFi hotspot, access point 126-1 may in some aspects also be the communications subsystem 118-1. Otherwise, the access point 126-1 is connected to the communications subsystem 118-12 through line 116-1 and is also connected to antenna 128-1. WiFi and Bluetooth are likely access point means as most smartphones and personal communications devices are so enabled.

Returning to FIG. 1D, in one aspect the coordinated mobile media projection system comprises a media projection system 102-1, as described above, having a selectively enabled interface for supplying a portion of coordinated media 108-1. The system further comprises a publically accessible access point 126-1, as described above, also supplying a portion of a coordinated media 108-2, presented on a wirelessly connected user device 130, as described above. Thus, the display and/or speaker of the wirelessly connected personal device may be referred to as a type of MPS interface. The combination of MPS and AP supply a coordinated mobile media integrated presentation, with a first portion of the coordinated media being linked to a second portion of the coordinated media. As in the examples above, the coordinated media may be identical, presented in a time sequence (typically spaced in time to make intuitive sense as a unified message), as related topics, or as different sections of a billboard.

In one aspect the access point 126-1 accepts Uniform Resource Locator (URL) address requests via antenna 128-1 from a user device 130, such as a smartphone, and transmits the URL address requests, via the communications subsystem 118-1, to a Domain Name System (DNS) service 132 embedded server memory 134. In this aspect, the communication subsystem 118-1 may receive coordinated media uploads related to the URL address requests. If not arranged as master-slave, the multiple MPSs may receive associated portions of the coordinated media. Otherwise, if MPS 102-1 is a master, it may receive all the portions of the coordinated media, and then distribute the portions to corresponding MPS peers.

In another aspect the MPSs, again using MPS 102-1 as an example, further comprise a camera 138 having an output to supply images on line 116-1 of a proximate geographic location to the platform. The communications subsystem 118-1 transmits the images to the server 120, or stores the images in local memory 124-1. The camera images may also be used to modify the value of the target location. For example, the recorded traffic in a location may be greater than anticipated, and the target value adjusted accordingly. That is, images recording higher pedestrian or vehicular traffic may have greater value. The data may be used to help determine the efficacy of the media or location. Alternatively or in addition, the camera images my act to verify that the projector 106-1 has been enabled. In one aspect, simply recording a change in images, and thus proximate traffic, can be used as a means for proving media projection subsystem enablement. In one aspect the camera 138 is directed towards the media subsystem viewing screen (if used). In this manner any distortion of the image caused as a result of the screen presenting a non-planar or atypical surface can be corrected by the image projector (if used), or by a server-based correction software application (not shown).

Optionally, a facial recognition software application 140 is stored in a non-transitory memory 134 of the server 120, enabling a sequence of processor executable instructions for comparing the received camera images to facial data, and cross-referencing recognized facial data to associated publically available social network data. DeepFace is an example of one such facial recognition system. As a further option, the facial recognition software application 140 may select the coordinated media in response to the social network data and transmit the coordinated media one of the plurality of communications subsystems, assuming a master-slave MPS arrangement. If arranged in a master-slave relationship, only one MPS may receive the uploads, which it then distributes to other MPSs in the system. If not arranged as master-slave, individual MPSs may receive associated portions of the coordinated media.

More generally, the access point and camera can be used to support a type of data mapping. The access point is publically accessible to user devices 130 that include smartphones, personal devices, or generally, any type of computing device. Typically, the user devices 130 are enabled for WiFi and Bluetooth communications. As used herein, the term data mapping includes the collection of data from the user devices 130. In one aspect, user data information (e.g., IP addresses, names, etc.) is collected voluntarily, with the user explicitly agreeing to data collection in response to an access point provided services, such as the provision of an Internet browser, email, Internet, or social media services. Otherwise, the information is collected without an explicit agreement by the user, where legal. Rewards to the system related entities may be based upon the volume of traffic through the WiFi hotspot or access point data collected.

As is common in many computer systems, a processor 142-1 is connected to the bus line 116-1, to pull operating instructions from operating system (OS) 144-1 and software applications in memory 124-1, and manage communications between the various components of system 100. Likewise, server 120 would be enabled through the use of processor 146. For ease of understanding, the above-described functions have been described as individual components. However, it should be understood that in practice, multiple functions may be performed by a single device or subsystem.

As shown, the server 120 comprises an antenna 148 connected to communications device 150, to send and receive information to and from MPSs. The communications device 150 may incorporate Internet and Ethernet linkages 154, such as might be used to connect to cell towers or cloud search engines. An interface on line 152, also referred to as a customer portal, receives client goals such target market, deployment hours, deployment rate, and target positions to name a few examples. For example, positions meeting the client goals may be responsive to factors such as location, local demographics, traffic, population density, length of deployment, and combinations thereof. An operating system (OS) 154 works in cooperation with the processor 146 to enable software applications in memory 134 and to process information to and from communications device 150.

Figure 4:
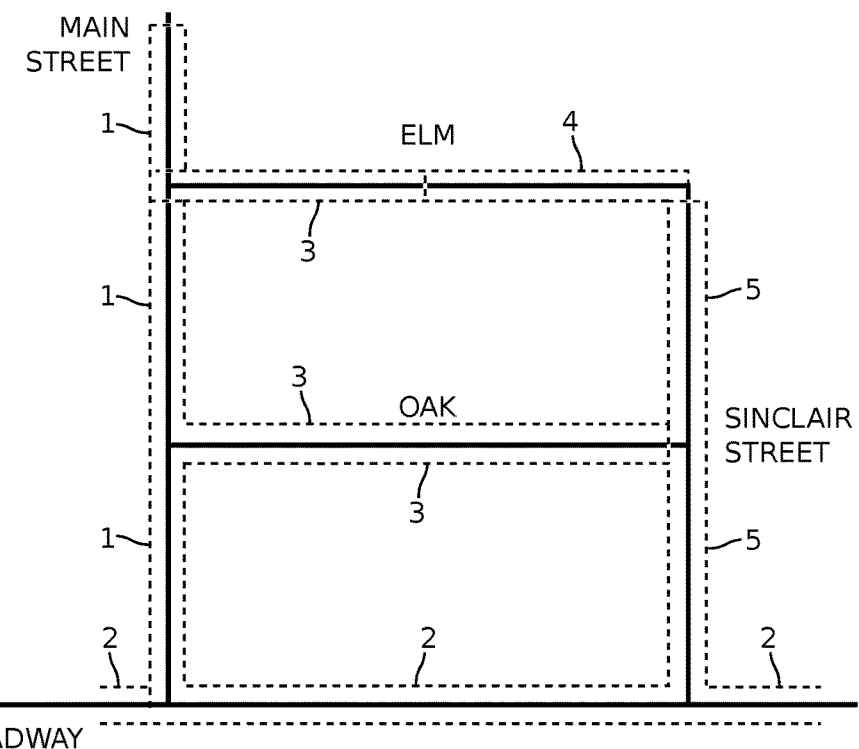
FIG. 4 is a plan view of a geographic regions cross-referenced to the weighted value of various geographic positions.

FIG. 4 is a plan view of a geographic regions cross-referenced to the weighted value of various geographic positions. As shown, regions along Main Street have a value of 1, the highest rated value. The regions along Broadway have a value of 2. The regions along Oak have a value of 3. The region along Elm near Main Street have a value of 3, which decreases to a value of 4 near Sinclair Street, and the regions along Sinclair Street have a value of 5.

The systems described above can be adapted for use in a model where an advertiser pays for service based upon performance. For example, an advertising client may contract with a system provider stipulating a target market and deployment hours/rate. The system provider determines geo-fenced locations that meet or exceed the advertiser's target market based on location, demographics, traffic, population density, and other variables. Platform deployment time, location, quality code, and user information are recorded by the server. A system provider algorithm determines platform performance based on length of deployment, contracted rate, maintenance cost reimbursement, and location quality code.

The systems described above support a targeted mobile sign (MPS) system, where the mobile sign is selectively deployed. In cooperation with the deployment of the sign, an organization or user associated with the sign is directed to preferred locations. For example, the deployment of the sign along a busy urban thoroughfare is likely to have a greater value than deployment on a suburban side-street. Other factors that may be used to calculate target value may include the time of day and the length of deployment. Thus, some key features to the system are determining that the sign has actually been deployed, and once deployed, the location of the system. In some aspects, the sign is a type of visual display, but other aspects may include just an auditory presentation, a combination visual and auditory presentation, or a presentation that is able to interact with a proximate viewer.

In one aspect, the system communicates a deployment message and supporting systems receive the deployment message and determine the deployment location. This information can be relayed in real-time to a server entity. Alternatively, the information can stored in memory of the supporting system and transferred to the server at periodic intervals or upon the attainment of predetermined metrics such as the number of deployments.

Figure 5:
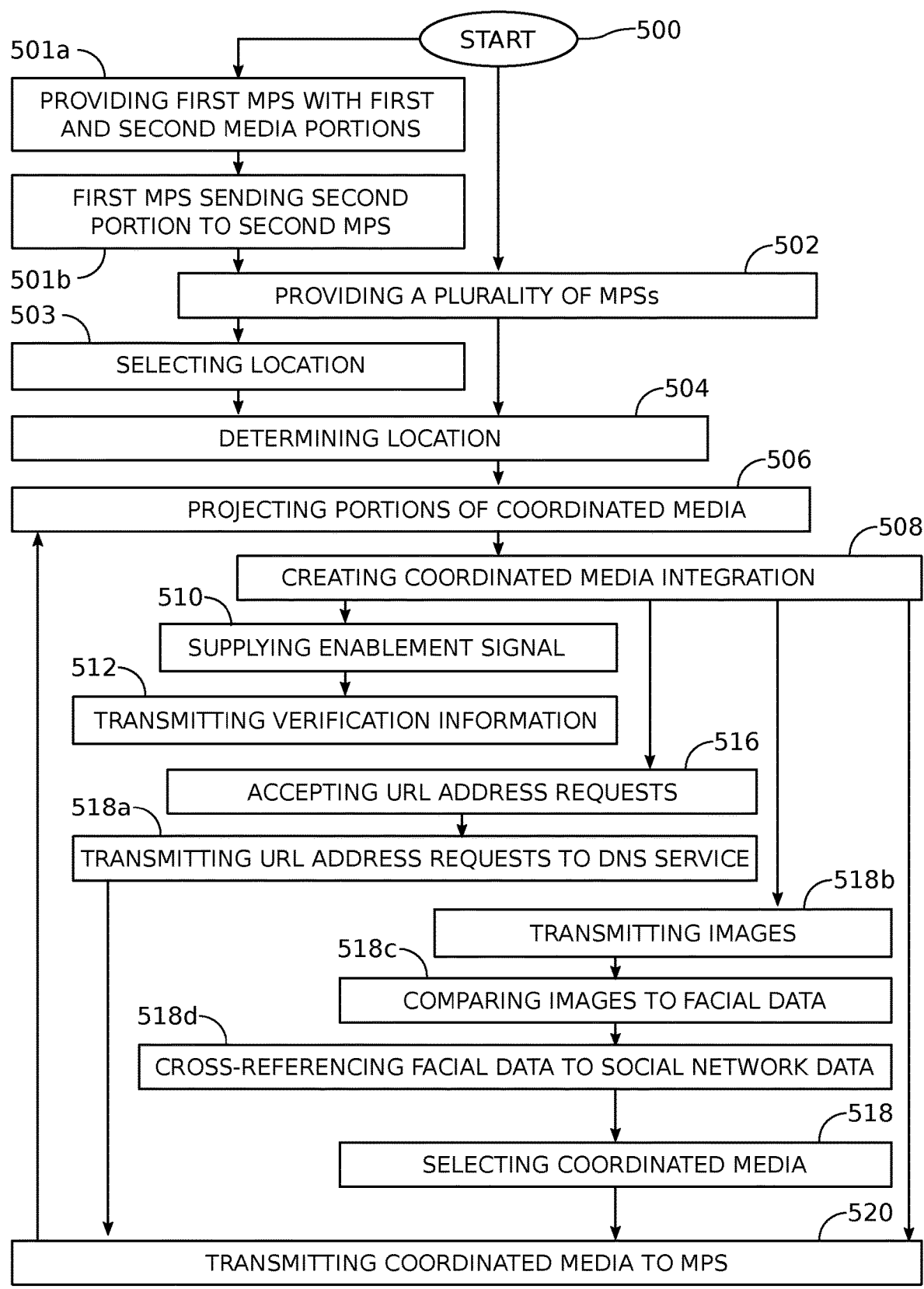
FIG. 5 is a flowchart illustrating a method for coordinating mobile media partitioned projections.

FIG. 5 is a flowchart illustrating a method for coordinating mobile media partitioned projections. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method steps are supported by the above system descriptions and, generally, the method follows the numeric order of the depicted steps. The method starts at Step 500.

Step 502 provides a plurality of media projection systems (MPSs). Each media projection system is configured for attachment to a mobile platform. As explained above, the mobile platforms can be ground-based platforms, aircraft, water-based platforms, or combinations thereof. Step 504 determines the geographic location of each MPS. The geographic location is typically stationary or a moving location route or path. Step 506 selectively presents a portion of a coordinated media by each MPS, which may be a displayed image, broadcast sound, or a combination thereof. In one variation the first portion of the coordinated media is identical to the second portion of the coordinated media. In another variation the second portion of the coordinated media is projected subsequent to the first portion of the coordinated media. Otherwise, the first portion of the coordinated media may be a first half of a billboard display, while the second portion of the coordinated media is the second half of the billboard display. In one aspect, the first portion of the coordinated media is a first topic and the second portion of the coordinated media is a second topic, related to the first topic. Step 508 creates a coordinated mobile media integrated display (e.g., a unified image comprised of multiple image sections), with a first portion of the coordinated media being linked to a second portion of the coordinated media.

In one aspect, Step 510 includes each MPS supplying an enablement signal, in response to one of the following conditions: the mobile platform occupying an assigned position, the MPS media being presented, or a combination thereof. If Step 502 provides each MPS with an identification code, then Step 512 may transmit verification information including the identification code, the enablement signal, and the geographic location, to a server or central controller. Alternatively, Step 512 records the verification information in local memory. In another aspect, Step 520 includes the MPSs receiving an upload of coordinated media portions from a server.

In one aspect, Step 502 provides at least one MPS with a publically accessible WLAN, WPAN, or both WLAN and WPAN access point. In this case, Step 516 may optionally accept Uniform Resource Locator (URL) address requests from a user device. Step 518*a* transmits the URL address requests to a Domain Name System (DNS) service, and Step in 520 the MPS receives coordinated media uploads related to the URL address requests.

In another aspect, Step 503 selects a MPS geographic location from a plurality of potential geographic locations. Typically, each potential geographic location has a corresponding weighted value. Step 502 provides MPSs associated with corresponding entities, so that Step 522 provides rewards to the entities corresponding to the value of the selected geographic location. Further, a server client associated with the MPSs may supply the rewards.

Optionally, Step 518*b* transmits images of the geographic location proximate to the mobile platforms. Step 518*c* compares the captured images to facial data. Step 518*d* cross-references recognized facial data to associated publically available social network data. Step 518*e* selects coordinated media in response to the social network data, and in Step 520 the coordinated media is transmitted to the MPSs.

In one variation, Step 501*a* provides a first MPS with the first and second portions of the coordinated media stored in local memory. In Step 501*b* the first MPS sends the second portion of the coordinated media to the second MPS. Then, selectively projecting the portion of the coordinated media from each MPS in Step 506 includes the first MPS presenting the first portion of the coordinated media and the second MPS presenting the second portion of the coordinated media.

Figure 6A:
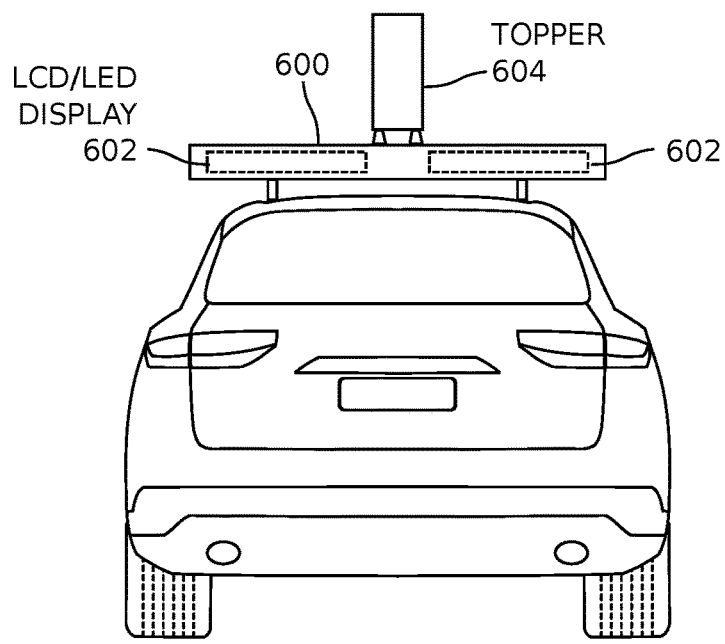
FIGS. 6A through 6C depict the MPS enabled as an LCD or LED display.
Figure 6B:
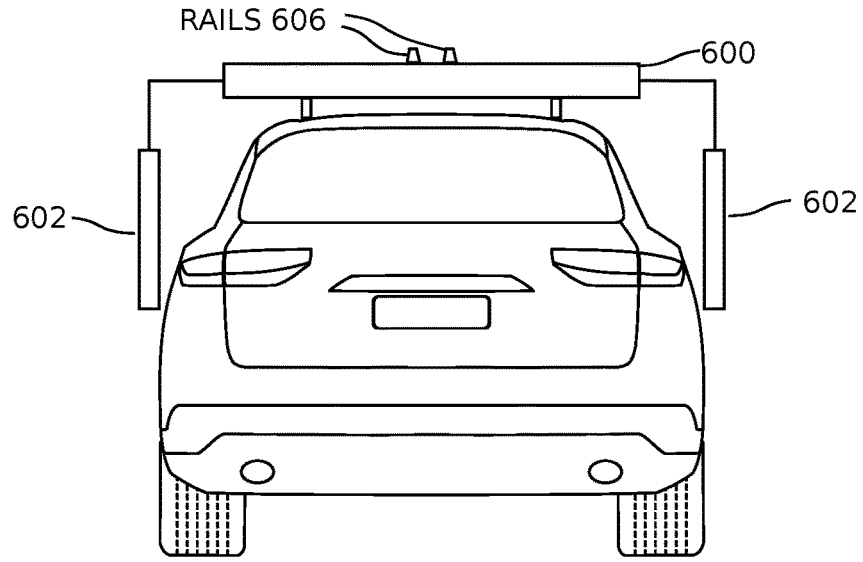
Figure 6C:
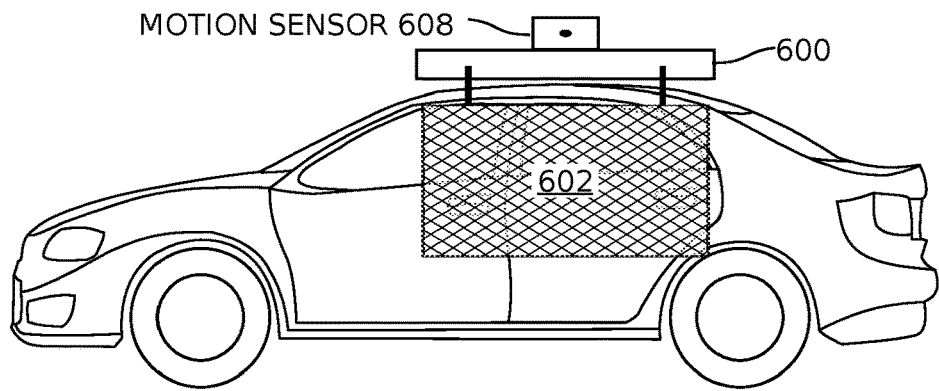

FIGS. 6A through 6C depict the MPS enabled as an LCD or LED display. In FIG. 6A MPS 600 includes rigid panel displays 602 (shown in phantom) secured inside a MPS chassis for storage while the vehicle is being moved. In FIGS. 6B and 6C the displays 602 are deployed over an exterior surface of the vehicle. FIG. 6A also depicts a MPS topper 604 secured to the top of the chassis, as shown for example by roof rack type rails 606. Media messages are formed on the side panels of the topper 604. Typically the side panels are backlit so the media messages can be seen at night. Toppers are often used for advertising, as mounted on taxis or commercial automobiles. The topper 604 may also be an electronic display such as an LCD or LED display 600. FIG. 6C depicts a motion sensor 608 mounted on the MPS chassis or on the display (not shown). The motion sensor permits the displays to be powered down, to save energy, if no pedestrian or vehicular traffic is detected. Although not shown, the MPS interfaces in this figure may be a portion of a coordinated media with any of the other MPS interfaces described herein.

Figure 7:
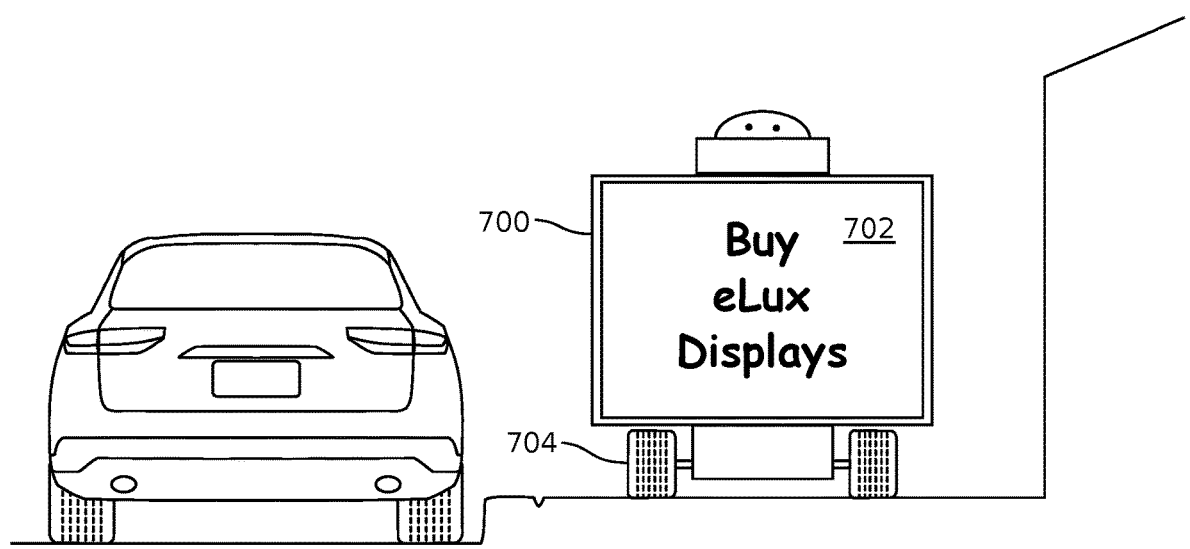
FIG. 7 depicts a perspective view of an exemplary pedestrian media projection system occupying a position on a sidewalk.

FIG. 7 depicts a perspective view of an exemplary pedestrian media projection system occupying a position on a sidewalk. MPS 700 is mounted on a movement subsystem 702 and has an interface 704 to present media. Although not shown, the MPS interface may be a portion of a coordinated media with any of the other MPS interfaces described herein.

Figure 8A:
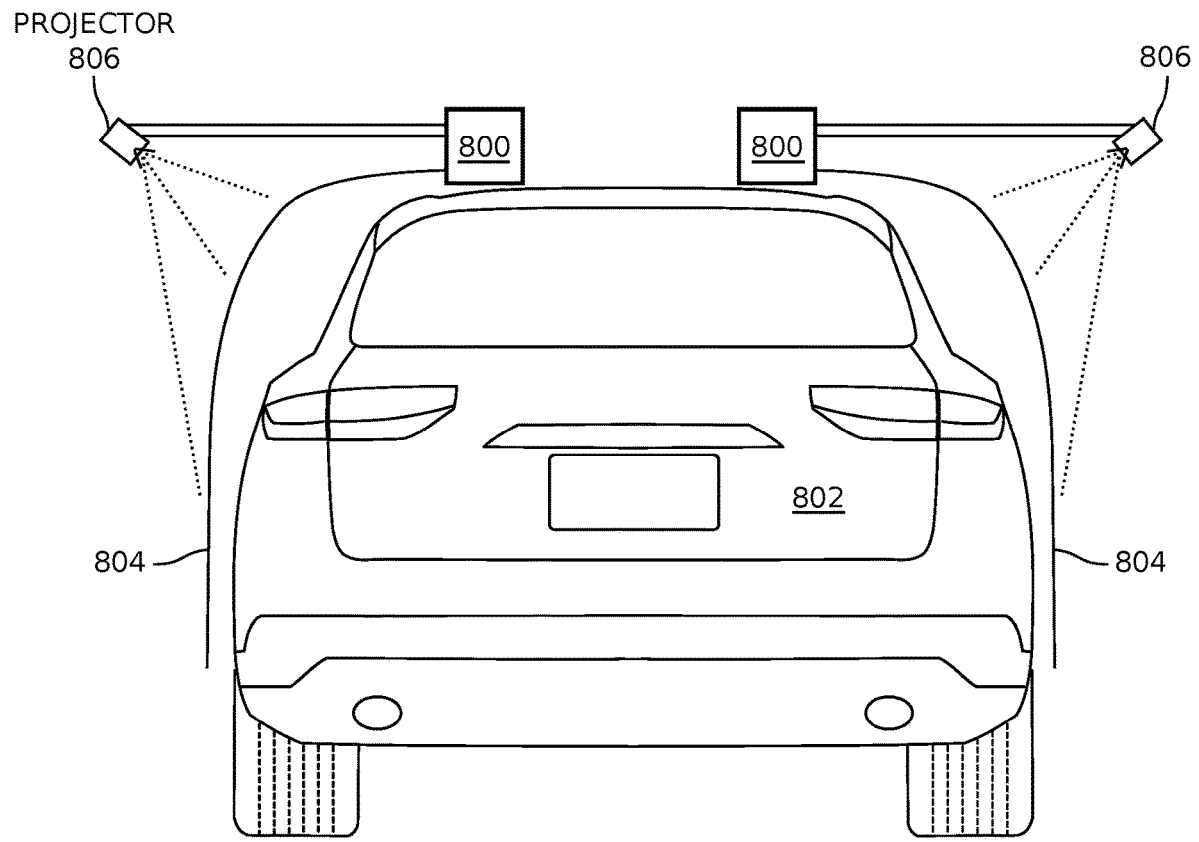
FIGS. 8A and 8B are diagrams depicting the MPS enabled as an image projector.
Figure 8B:
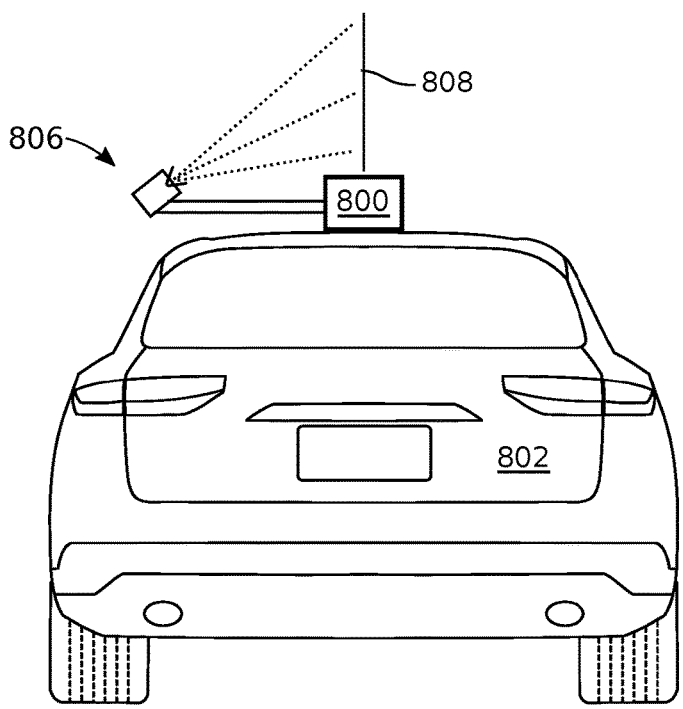

FIGS. 8A and 8B are diagrams depicting the MPS enabled as an image projector. Here, the MPS 800 is configured for attachment to the roof of an automotive vehicle 802. In FIG. 8A a viewing screen 804 is deployed over an exterior surface (e.g., door) of the automotive vehicle 802. However, it should be understood that the viewing screen may, alternatively, be deployed over other exterior surfaces (e.g., front or back). Here, two MPSs are shown with associated projectors 806, and with screens 804 overlying driver and passenger side doors. However, the system is not limited to any particular number of chasses, with supporting subsystems. In FIG. 8B a MPS popup interface 808 extends vertically up from a substantially planar horizontal roof. Alternatively but not shown, two imaging projectors may project images on both sides of the popup viewing screen. Otherwise, the popup screen may be a simple printed screen or an LED screen. Although not shown, the MPS interfaces shown in this figure may be a portion of a coordinated media with any of the other MPS interfaces described herein.

Figure 9:
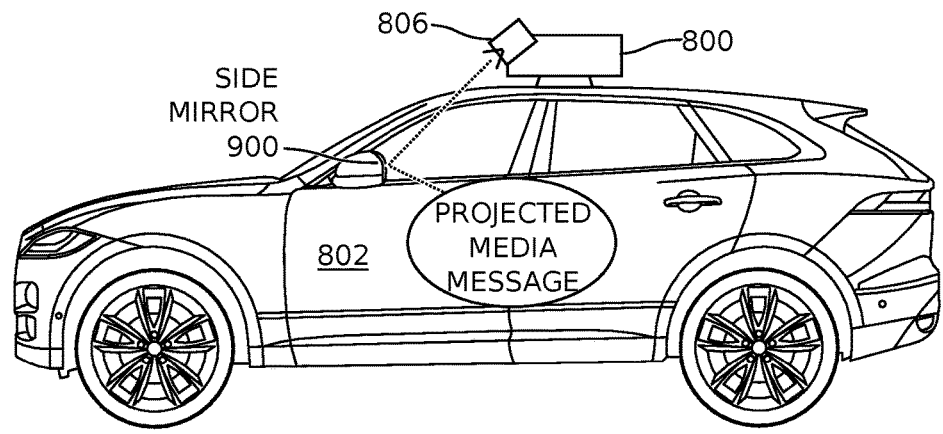
FIG. 9 depicts a variation of the MPS enabled with an image projector.

FIG. 9 depicts a variation of the MPS enabled with an image projector. In this aspect the MPS 800 is configured for attachment to a roof of an automobile 802, having a side mirror 900. An imaging projector 806 is selectively engageable to project an image (projected media message) on the side mirror 900, with the image being reflected by the side mirror. The image can be reflected, for example, on a vertical exterior surface of the automobile (e.g., door) as shown, a sidewalk located adjacent to the automobile, or a wall located adjacent to the automobile. In some aspects, if the imaging surface is a dark color or a rough surface, a portable screen may be temporarily attached to the surface. For example, in the case of a car door imaging surface, a magnetic screen can be temporarily applied to the door, or the screen can be hung from the top of the door or clamped by the window. Although not shown, the MPS side mirror projector interface may be a portion of a coordinated media with any of the other MPS interfaces described herein.

Figure 10:
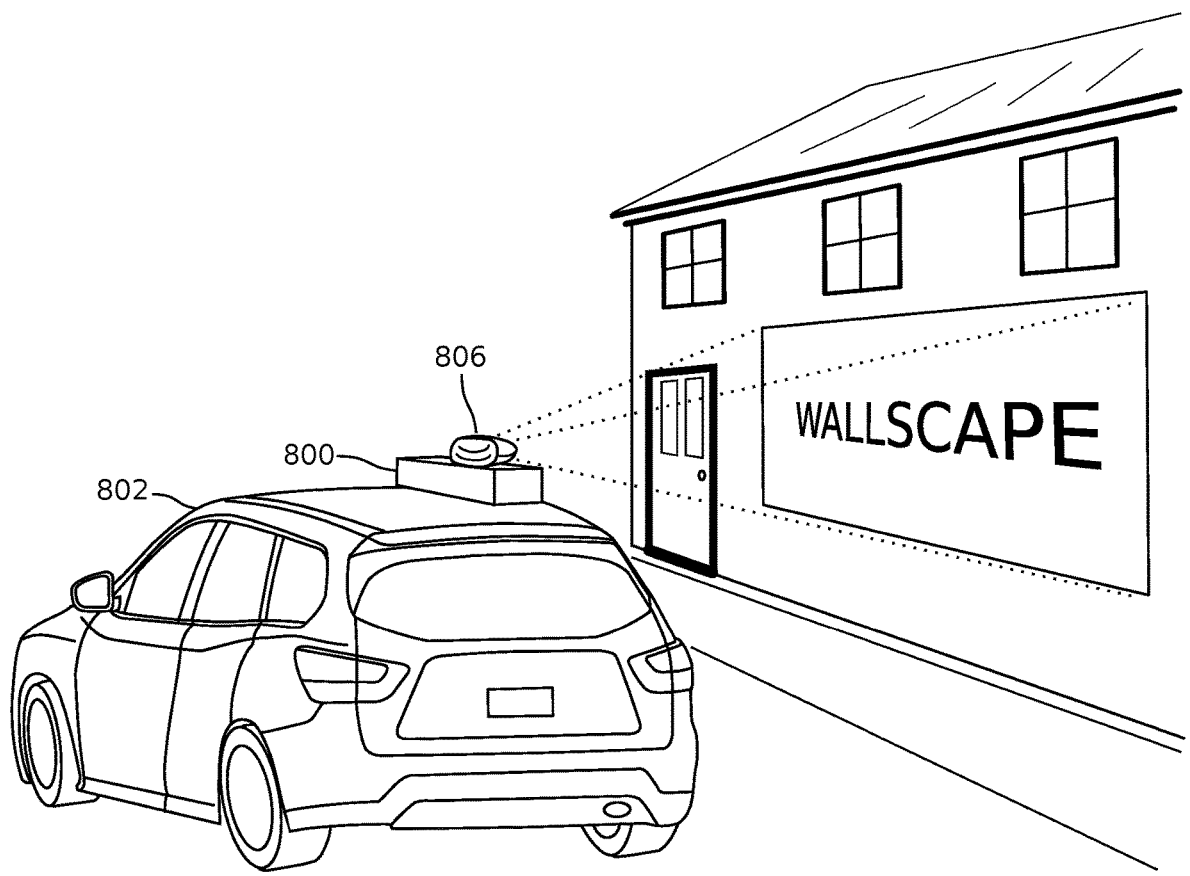
FIG. 10 is a diagram depicting the MPS enabled as a wallscape.

FIG. 10 is a diagram depicting the MPS enabled as a wallscape. As shown, the MPS 800 and imaging projector 806 are configured for attachment to the roof of an automobile 802. The imaging projector 806 is selectively engageable to project an image on an adjacent vertical wall surface when the mobile platform 802 is parked in a stationary geographic location. Although not shown, the MPS projector interface may be a portion of a coordinated media with any of the other MPS interfaces described herein.

Figure 11:
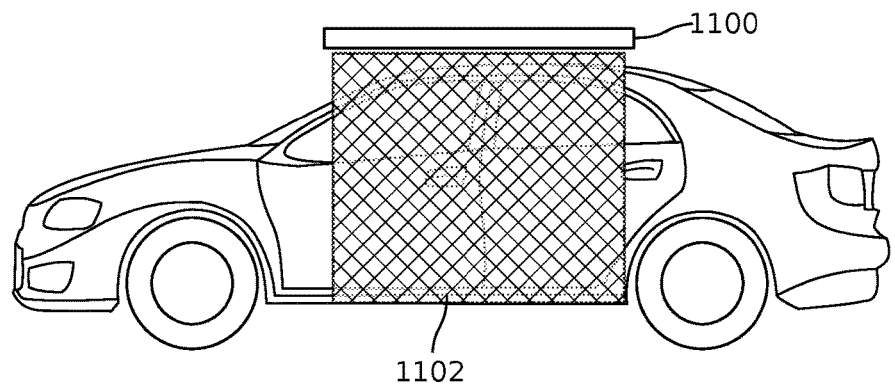
FIG. 11 is a diagram depicting the MPS enabled with a retractable screen.

FIG. 11 is a diagram depicting the MPS enabled with a retractable screen. The MPS 1100 is mounted to an automobile roof and the screen 1102 is retractable. The screen 1102 may be printed with a fixed advertising message, warning, or alert. In one aspect, the screen includes a field of light emitting diodes (LEDs) or liquid crystal display (LCD) for projecting (i.e., creating) a visual image. Although not shown, the MPS screen interface may be a portion of a coordinated media with any of the other MPS interfaces described herein.

Figure 12:
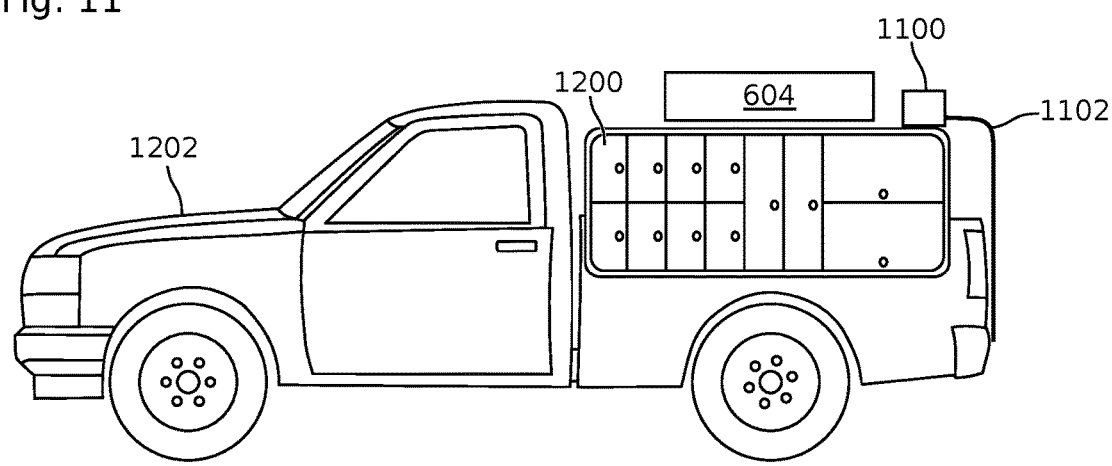
FIG. 12 is a diagram depicting a mobile platform including a mobile locker system in combination with a MPS.

FIG. 12 is a diagram depicting a mobile platform including a mobile locker system in combination with a MPS. The mobile locker system 1200 is described in detail in parent application Ser. No. 17/097,256, filed on Nov. 13, 2020, entitled SYSTEM AND METHOD FOR MOBILE GIG LOCKER, and which is incorporated herein by reference. Besides the mobile lockers 1200, the mobile platform 1202 also includes a MPS 1100 with a deployed viewing screen 1102, and a topper 604. Although a pickup truck mobile platform 1202 is shown as an example, it should be noted that the combination of the mobile lockers 1200 and MPSs are not limited to any particular type of mobile platform. Likewise, although a topper 604 and screen 1102 are shown as examples, the combination of mobile lockers and media subsystem are not limited to any particular media projection subsystem. Although not explicitly shown in this figure, the combination of mobile locker and media subsystem may further include a publically accessible access point, as described above. The MPS interfaces in this example may be portions of a coordinated media in combination with other MPS interfaces described herein.

FIG. 13 is a diagram depicting MPS media interfaces formed on multiple surfaces of a truck body. The MPS interfaces 1300a and 1300b may be LCD or LED displays, electronic displays enhanced with LED lighting, or simply printed or painted screens, or any of the other MPS interfaces described herein. Interfaces 1300a and 1300b may be portions of a coordinated mobile media integrated display, or independent displays. Although not shown, the right side of the truck may also include an MPS interface display. Also not shown, the MPS interfaces in this example may be portions of a coordinated media in combination with other MPS interfaces described herein.

Figure 14:
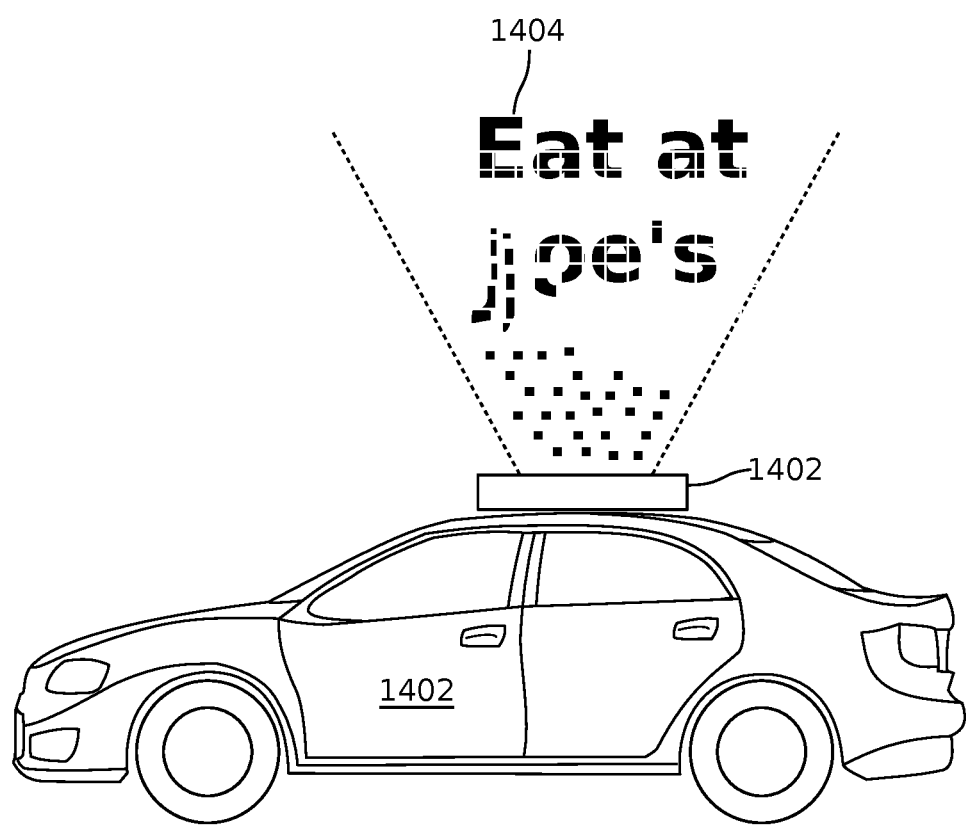
FIG. 14 is a diagram depicting the MPS media interface as a holographic image.

FIG. 14 is a diagram depicting the MPS media interface as a holographic image. In this example, the mobile platform 1400 is a car, the MPS 1402 is mounted on the roof of the car to present a holographic image 1404. Although the image is presented overlying the mobile platform 1400, alternatively it may be presented adjacent to the platform. The holographic image may be a portion of a coordinated media in combination with another holographic image or any of the other above-described MPS interfaces.

Figure 15:
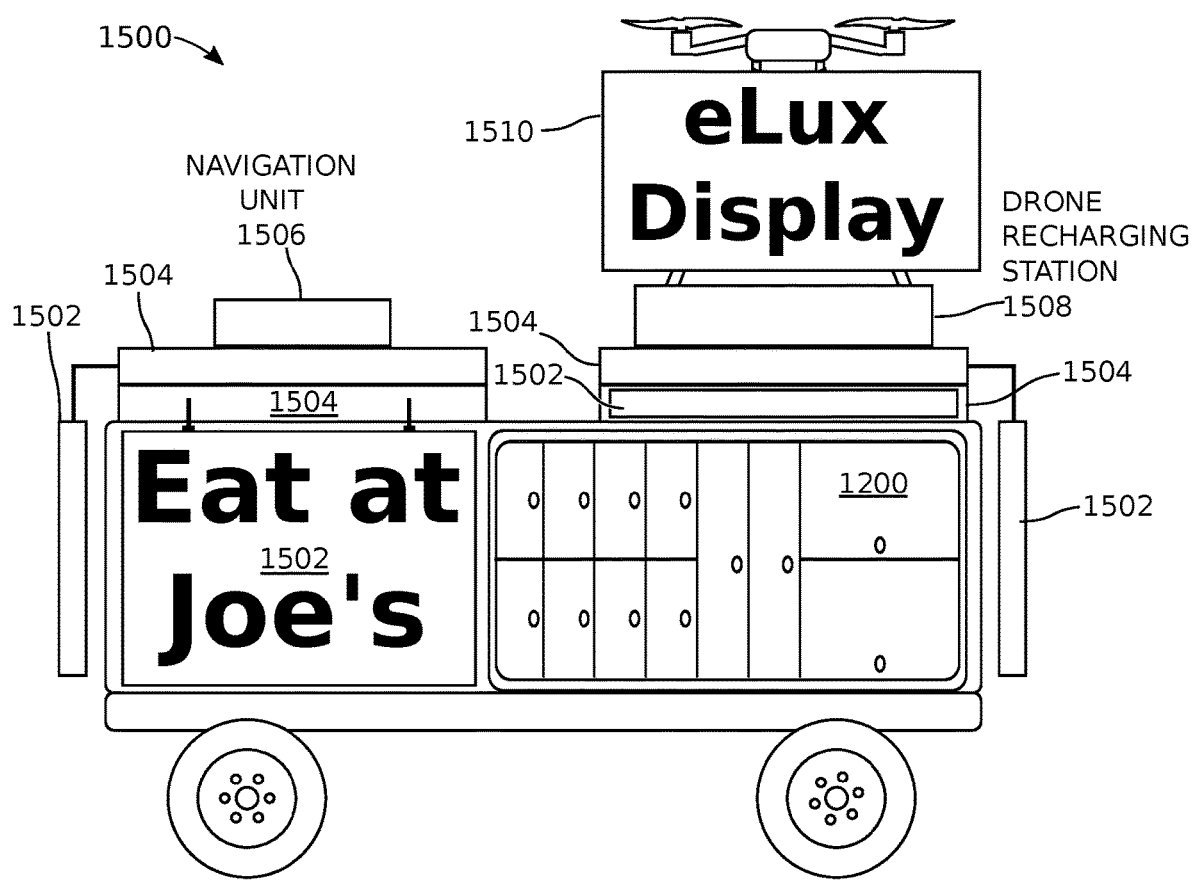
FIG. 15 is a drawing depicting an autonomous driving mobile platform.

FIG. 15 is a drawing depicting an autonomous driving mobile platform. The mobile platform 1500 is equipped with a plurality of MPS interfaces 1502 that are shown in this example as electronic or passive display screens, but it should be understood that other types of MPSs may also be used. The display screens 1502 are retractable into chasses 1504 for storage, when the platform 1500 is moving, or to expose lockers 1200 mounted behind the screens. Although only three sides of the vehicle 1500 are depicted, it should be understood that lockers and displays may also be arranged on the unseen side of the platform. The autonomous platform 1500 also comprises a navigation unit 1506. The navigation unit may include an autonomous driving application stored in a non-transitory navigation unit memory and enabled as a sequence of processor executable steps for autonomously driving the mobile platform to a selected mobile platform geographic location destination. As would be understood in the art, a vehicle equipped for autonomous driving might include sensors such as cameras, LIDAR, SONAR, photodector ranging systems, and inertial measurement units (IMUs), which would also be included as part of the navigation unit 1506. Obviously, such an equipped vehicle would include mechanisms for steering, braking, and acceleration. Examples of commercial autonomous self-driving systems are provided by Tesla, Waymo, and Nuro. The navigation unit 1506 would also likely include location and communication subsystems, as described above.

In one aspect, the autonomous mobile platform 1500 further comprises a drone charging station 1508. The charging station 1508 has a top surface to accept a drone or unmanned aerial vehicle (UAV) 1510 for landing, and to recharge or refuel the drone so that it is able to remain on station in the air for extended periods of time. In one aspect, the drone 1510 can be securely fastened to the recharging station 1508 for transportation on the ground via the mobile platform 1500.

System and methods have been provided for organizing portions of a media message into a coherent whole message, where the end result perception is greater than the sum of the individual portions. Examples of particular message structures, schematic block linkages, and hardware units have been presented to illustrate the invention. However, the invention is not limited to merely these examples. Other variations and embodiments of the invention will occur to those skilled in the art.

We claim:

1. A coordinated mobile media projection system comprising:
   a plurality of media projection systems (MPSs), each media projection system configured for attachment to a mobile platform and comprising:
      a selectively enabled interface for supplying a portion of coordinated media;
      a location subsystem to determine a geographic parking location of the MPS;
   a targeting software application stored in a non-transitory memory, enabling a sequence of processor executable instructions permitting the selection the MPS geographic locations from a plurality of potential geographic parking locations; and,
   wherein the combination of MPSs supplies a coordinated mobile media integrated display, with a first portion of the coordinated media being linked to a second portion of the coordinated media.

2. The system of claim 1 wherein each MPS further comprising:
   a deployment subsystem having an interface to supply an enablement signal, in response to an action selected from the group consisting of the mobile platform occupying an assigned position, the MPS being enabled, or a combination thereof.

3. The system of claim 2 wherein each MPS is associated with an identification code;
   wherein each MPS further comprises:
      a communications subsystem having an interface to receive verification information including the identification code, the enablement signal, and the geographic location.

4. The system of claim 3 wherein the communications subsystem transmits the verification information.

5. The system of claim 1 wherein the mobile platforms are selected from the group consisting of ground-based platforms, water-based platforms, aircraft, and combinations thereof.

6. The system of claim 1 wherein the first portion of the coordinated media is identical to the second portion of the coordinated media.

7. The system of claim 1 wherein the second portion of the coordinated media is projected subsequent to the first portion of the coordinated media.

8. The system of claim 1 wherein the first portion of the coordinated media is a first half of a billboard display and the second portion of the coordinated media is a second half of the billboard display.

9. The system of claim 1 wherein the first portion of the coordinated media is a first topic and the second portion of the coordinated media is a second topic, related to the first topic.

10. The system of claim 1 wherein each MPS further comprising:
    a publically accessible access point selected from the group consisting of an IEEE 802.11 Wireless Local Area Network (WLAN), IEEE 802.15 Wireless Personal Area Network (WPAN), or combinations thereof.

11. The system of claim 10 wherein the access point accepts Uniform Resource Locator (URL) address requests from a user device and transmits the URL address requests, via the communications subsystem; and,
    the system further comprising
    a Domain Name System (DNS) service to receive the URL address requests.

12. The system of claim 1 wherein each potential geographic location has a corresponding weighted value with rewards corresponding to the value of the selected geographic location.

13. The system of claim 1 wherein the MPSs supply media selected from the group consisting of a displayed image, broadcast sound, or a combination thereof.

14. The system of claim 1 wherein each MPS further comprises:
    a camera having an output to supply images of a proximate geographic location to the mobile platform.

15. The system of claim 1 wherein the MPSs receive uploads, including coordinated media portions, from a server.

16. The system of claim 1 wherein a first MPS comprises:
    a non-transitory memory including the first portion of the coordinated media and the second portion of the coordinated media;
    a communications subsystem having an interface to transmit the second portion of the coordinated media to a second MPS;
    wherein the first MPS supplies the first portion of the coordinated media;
    wherein the second MPS further comprises:
       a communications subsystem having an interface to receive the second portion of the coordinated media from the first MPS; and,
    wherein the second MPS supplies the second portion of the coordinated media.

17. The system of claim 1 wherein a plurality of MPS are mounted on the same mobile platform.

18. A method for coordinating mobile media partitioned presentations, the method comprising:
- providing a plurality of media projection systems (MPSs), each media projection system configured for attachment to a mobile platform;
- each MPS selecting a geographic location from a plurality of potential geographic parking locations;
- determining the geographic parking location of each MPS;
- selectively presenting a portion of a coordinated media from each MPS; and,
- creating a coordinated mobile media integrated display, with a first portion of the coordinated media being linked to a second portion of the coordinated media.

19. The method of claim 18 further comprising:
- each MPS supplying an enablement signal in response to an action selected from the group consisting of the mobile platform occupying an assigned position, the MPS media being enabled, or a combination thereof.

20. The method of claim 19 wherein providing the MPSs includes providing each MPS with an identification code; and,
- the method further comprising:
  - transmitting verification information including the identification code, the enablement signal, and the geographic location, to a server.

21. The method of claim 18 wherein providing the MPSs includes providing MPSs configured for attachment to mobile platforms selected from the group consisting of automotive vehicles, water-based platforms, aircraft, and combinations thereof.

22. The method of claim 18 further comprising:
- the MPSs receiving uploads, including coordinated media portions, from a server.

23. The method of claim 18 wherein providing the plurality of MPSs includes providing at least one MPS further comprising a publically accessible access point selected from the group consisting of an IEEE 802.11 Wireless Local Area Network (WLAN) IEEE 802.11, an IEEE 802.15 Wireless Personal Area Network (WPAN), and combinations thereof.

24. The method of claim 18 further comprising:
- selecting a MPS geographic location from a plurality of potential geographic parking locations with corresponding weighted values.

25. A media system coordinating a billboard with mobile media, the media system comprising:
- a billboard permanently stationed in a first location, presenting a portion of coordinated media; and,
- at least one selectively enabled media projection system (MPS) configured for attachment to a mobile platform, parked adjacent to the first location, having an interface supplying a portion of coordinated media and having a location subsystem to determine a parking location;
- a targeting software application stored in a non-transitory memory, enabling a sequence of processor executable instructions permitting MPS selection of the first location from a plurality of potential billboard locations; and,
- wherein the combination of the MPS and billboard supplies a coordinated mobile media integrated display, with a first portion of the coordinated media being linked to a second portion of the coordinated media.

26. A coordinated mobile media projection system comprising:
- a media projection system (MPS) configured for attachment to a mobile platform and comprising:
  - a selectively enabled interface for supplying a portion of coordinated media;
  - a location subsystem to determine the geographic parking location of the MPS;
  - a publically accessible access point (AP) selected from the group consisting of an IEEE 802.11 Wireless Local Area Network (WLAN) IEEE 802.11, an IEEE 802.15 Wireless Personal Area Network (WPAN), and combinations thereof, configured for attachment to the mobile platform and supplying a portion of a coordinated media, presented on a wirelessly connected user device; and,
  - wherein the combination of MPS and AP supply a coordinated mobile media integrated presentation, with a first portion of the coordinated media being linked to a second portion of the coordinated media.

* * * * *